United States Patent
Judge et al.

[11] Patent Number: 6,014,610
[45] Date of Patent: Jan. 11, 2000

[54] NAVIGATION SYSTEM AND METHOD

[75] Inventors: Kevin Judge, Palos Verdes Estates; Ronald Hatch, Wilmington, both of Calif.

[73] Assignee: Greenfield Enterprises, Inc., Rolling Hills Estates, Calif.

[21] Appl. No.: 09/016,609

[22] Filed: Jan. 30, 1998

Related U.S. Application Data

[60] Provisional application No. 60/037,025, Jan. 31, 1997.

[51] Int. Cl.[7] .................................................. G01C 17/38
[52] U.S. Cl. ............................... 702/92; 33/356; 33/357; 701/224; 701/205
[58] Field of Search ............................... 702/92, 93, 104; 33/316, 319, 355 R, 356, 357, 352; 701/1, 200, 224, 205, 213, 214; 73/1.76, 1.75; 324/260

[56] References Cited

U.S. PATENT DOCUMENTS

| | | |
|---|---|---|
| 4,791,574 | 12/1988 | Thoone et al. .......................... 364/457 |
| 4,797,841 | 1/1989 | Hatch ................................. 364/571.04 |
| 5,046,031 | 9/1991 | Wanous ............................... 364/571.02 |
| 5,058,023 | 10/1991 | Kosikaro ................................. 364/457 |
| 5,117,375 | 5/1992 | Worcester et al. ................. 364/571.01 |
| 5,187,872 | 2/1993 | Dufour ..................................... 33/356 |
| 5,255,442 | 10/1993 | Schierbeek et al. ..................... 33/361 |
| 5,317,515 | 5/1994 | Matsuzaki .............................. 364/454 |
| 5,339,246 | 8/1994 | Kao ........................................ 364/457 |
| 5,345,382 | 9/1994 | Kao .................................... 364/424.01 |
| 5,390,122 | 2/1995 | Michaels et al. ....................... 364/443 |
| 5,440,484 | 8/1995 | Kao .................................... 364/424.01 |
| 5,511,319 | 4/1996 | Geerlings et al. ........................ 33/356 |
| 5,632,092 | 5/1997 | Blank et al. .............................. 33/361 |
| 5,644,851 | 7/1997 | Blank et al. .............................. 33/361 |
| 5,737,226 | 4/1998 | Olson et al. ............................ 364/457 |
| 5,761,094 | 6/1998 | Olson et al. ............................ 364/559 |
| 5,802,727 | 9/1998 | Blank et al. .............................. 33/361 |

*Primary Examiner*—Patrick Assouad
*Attorney, Agent, or Firm*—Lawrence S. Cohen, Esq.

[57] ABSTRACT

An electronic compass system and method in which an automatic calibration process is available while the vehicle is in use. The procedure uses a binning process to collect and count data points which automatically triggers the automatic calibration process, and which is also used for manual calibration. Also, there is a procedure for detecting and rejecting anomalous magnetic events outside the vehicle through a jitter phenomenon.

36 Claims, 21 Drawing Sheets

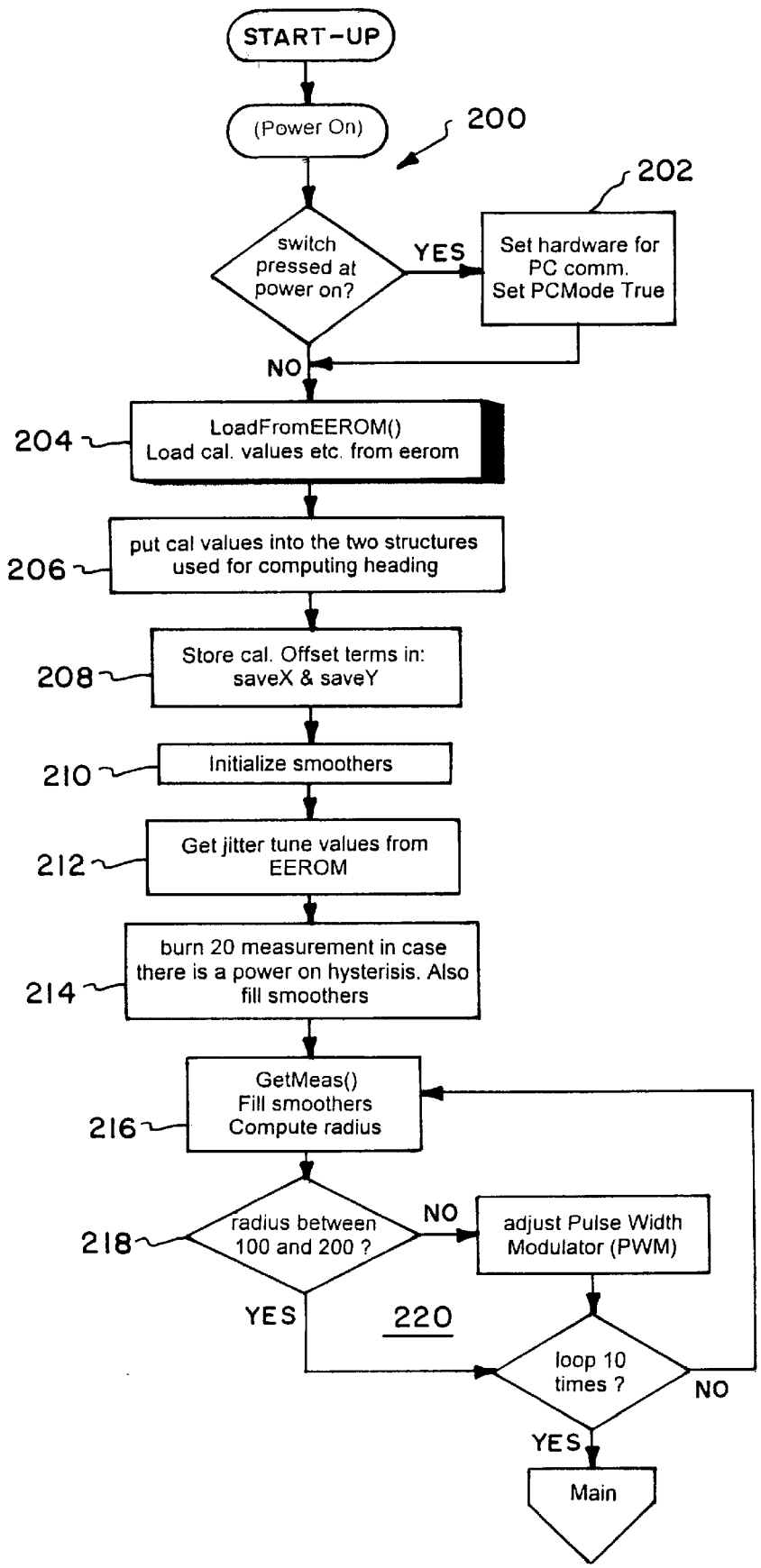

Main Process / Auto Calibration (Continued)

NAVIGATION SYSTEM AND METHOD

CROSS-NOTING TO PRIOR APPLICATION

This application claims the benefit of U.S. Provisional Application 601037,025 filed on Jan. 31, 1997, the content of which is incorporated herein by reference.

FIELD OF THE INVENTION

This invention relates to magnetic and non-magnetic sensors used for determining vehicle direction of travel, measuring vehicle movement, acceleration and deceleration and speed. Specifically this invention could be used to show a driver his direction of travel or it may be used as an aid to other navigational instruments such as, but not limited to the Global Positioning System (GPS). The invention further relates to a multi-sensor integrated vehicle navigation and location system.

REFERENCES TO APPENDICES

Attached as part of and incorporated into this application/patent are the following:
APPENDIX "A": The Following Listings Are An Exemplary Software Implementation Of The Foregoing Discussion
APPENDIX "B": Hatch U.S. Pat. No. 4,797,841

BACKGROUND

There is an increasing need in vehicles of all types for electronics which can supply data for use by the driver or some remote location away from the vehicle to determine in one example; in which direction the vehicle is traveling. This application is that of a stand-alone compass in which the heading of the vehicle could be displayed on a small electronic display as one of, let's say, eight points of the compass; North (N), South (S), East (E), West (W), Northeast (NE), Northwest (NW), Southeast (SE), and Southwest (SW). A more sophisticated version of such a stand-alone compass would be one which has sufficient performance and accuracy to display the heading degrees of a compass in 1 or 2 degree increments, as a numeric value or in an analog form like a needle on a compass rose.

Vehicle-mounted compasses must be calibrated to account for the magnetic signature of the vehicle. If there is a change in the magnetic signature of the vehicle a new calibration is necessary. However, it is often the case that the operator does not know the change and therefore, the reading will be off.

Also, in the event of transient magnetic disturbances, prior systems will hold the last heading before the disturbance began. When the disturbance ceases, a new correct heading is provided. Bridges, steel buildings or adjacent roadways built with ferrous material can cause transient magnetic anomalies.

One problem is in the detection of such an anomaly, because it may not be detected as an anomaly, in which case prior compasses will respond with incorrect readings. Also, an anomaly or recurring anomalies may be present for an extended length of time, for example, on modern highways such as overpasses, ramps and the like built with ferrous materials In another example, Navigation systems of various types have been developed which assist the vehicle operator or a passenger to navigate to or away from a particular location. Navigation systems generally employ some form of triangulation of a source of three or more radio signals to determine the position or location of the vehicle. Such systems have been created using the technologies of LORAN, DECCA, GPS, FM and AM radios signals, and other RF radio systems. By plotting the position changes of the vehicle over time on an electronic map such a navigation system is created. Such navigation systems work reliably as long as the radio signals can be received without interruption. There are serious limitations to such systems because the loss of one or more of the radio signals due to signal blockage can serious reduce the accuracy of the navigation system and often result in the failure of the system.

Navigation and location determination systems such as, for example, those employing Global Positioning System (GPS) technology including Differential GPS (DGPS) technology, often have limitations caused by the temporary unavailability of the signals they are receiving and using to determine the position of the vehicle. In the GPS and DGPS example, there are times when there are insufficient satellite signals available, such as in areas around tall buildings or other obstructive masses, to maintain continuous measurement of the position of the vehicle.

Very similar requirements and similar limitations exist in another example, Vehicle Location as distinguished from Vehicle Navigation; that of enabling, in the vehicle or at some remote location, the determination of where the particular vehicle is in relationship to a map or any other form of vehicle location determination. Such, applications range from supplying vehicle location data to occupants of an automobile or any other land, sea, air or space vehicle to a vehicle location determination system in an automobile or any other land, sea, air or space vehicle which enables pinpointing the vehicle's location on some form of electronic map display or by producing coordinates within various coordinate systems which would enable the location of the vehicle on a non-electronic map or grid of some sort.

In such cases there is a need for something which can continue to compute the location of the vehicle during these times. That is to say aiding the navigation or location system by outputting a continuous series of vehicle positions and maintaining the ability of the system to continue to function during times of signal outage or blockage. Using the integration of sensor data from various sources, and processing those data to compute the change position of the vehicle over time can do this. Such a technique would process inputs of data such as speed and movement from a speed sensor or an accelerometer with the heading of the vehicle measured from that last known position of the vehicle before the signal outage or blockage. Such a system may be called a Flywheel and in the case of GPS systems, a GPS Flywheel because metaphorically the system continues to operate even as the primary navigation or location system has been degraded or lost.

SUMMARY OF THE INVENTION

In one aspect, the invention is a compass system and method of particular application to vehicular use in which an automatic calibration is performed. In one particular, the automatic calibration is done by recording sensor data as the vehicle is driven in normal use, until the vehicle has been driven in a complete circle. This is detected and recorded by the system by dividing the circle defined by the system into segments or bins and ensuring that there is at least one data point in each bin. The means by which it is ensured that a data point is put in each bin if in fact each bin has been visited by the driving of the vehicle is by the constant adjustment of the offset parameters describing the center of the computed ellipse. An important feature of this and other aspects of the invention is the use of a high rate of readings from the magnetic sensor.

Another aspect of the invention senses the presence of transient magnetic anomalies moving relative to the vehicle and then rejecting the sensor readings of the anomaly in processing so as to not use those readings as output for heading indication. It has been found that transient magnetic bodies such as bridges, steel, reinforced buildings, overpasses and the like have a high frequency signature called jitter, which can be detected and distinguished and therefore can be rejected. Consequently, a heading prior to the onset of the jitter can be maintained as the compass system output without any change as long as the transient anomaly is present. Then, when the jitter ceases, sensor data processing resumes to give current headings. Consequently, due to the high rate of data readings, even a brief recess in jitter will allow good readings and therefore the output of a good heading. So, while for example passing a relatively extended anomaly source, good readings may be obtained and an updated heading will be provided. Only a brief period of quality data during the presence of a transient anomaly is enough to provide an update to give a good reading output.

Another aspect of the invention combines a compass system with a radio navigation system such as GPS, so that when GPS signals are lost, the compass system comes into operation to provide heading data. A fully integrated system is also contemplated, in which a precision radio navigation system such as GPS is integrated with alternative sensors such as a suite including a magnetic compass, a cross-track accelerometer, wheel turn sensors, and a speed sensor. An angular rate sensor may be used in place of a cross-rack accelerometer, or redundantly. This integrated system can provide advantages even in the presence of a full set of GPS satellites. The integration will allow use of the alternative suite as required to either supplement or substitute for the primary navigation system. This can be implemented using additional sensors such as a speed sensor, rate sensor and cross-track accelerometer. Good GPS navigation can be obtained with reception from as few as four GPS satellites or three if altitude is known. The invention considers the loss of data as GPS satellites are lost first to three, then to two, then to one, and finally, none.

The essence of this aspect of the new invention is to tailor the Kalman filter such that it can make optimum use of the associated speed and heading sensors. Specifically, the states included in the Kalman filter will include two horizontal position states in which the coordinate system is not critical. The third position state will be the vertical position. Also included will be the GPS receiver clock time and clock frequency states. The velocity states will include the speed in the vertical direction, the heading of the vehicle and the along track speed of the vehicle. The specific choice of these states makes it possible to easily reconfigure the Kalman filter whenever GPS satellites are lost such that the system accuracy will degrade only slowly. Thus, when the number of GPS satellites drops to three, the vertical Velocity State will be slowly changed to zero, i.e. to a height hold mode. When the number of satellites drops to two, the absolute readings from the GPS code measurements will be dropped and only the change in the carrier-phase measurements will be used. Furthermore, the carrier-phase measurements will not be used to feed the heading state. The heading state will be driven by the magnetic heading sensor and cross-rack accelerometer. When the number of GPS satellites drops to one, the GPS measurements will be used only to update the GPS receiver clock Frequency State. Whatever speed sensor is available will be used to drive the along-track Speed State. The magnetic compass and cross-track accelerometer will be used to drive the heading state. The standard time update process will obtain the position states.

A rate sensor can be used, in which case two or more calibration states might be included, which give a speed scaling to bring speed measurements into agreement with the GPS derived speed.

BRIEF DESCRIPTION OF DRAWINGS

FIG. 2B is a flow chart of the start-up portion of the software.

DETAILED DESCRIPTION

Figure 1:
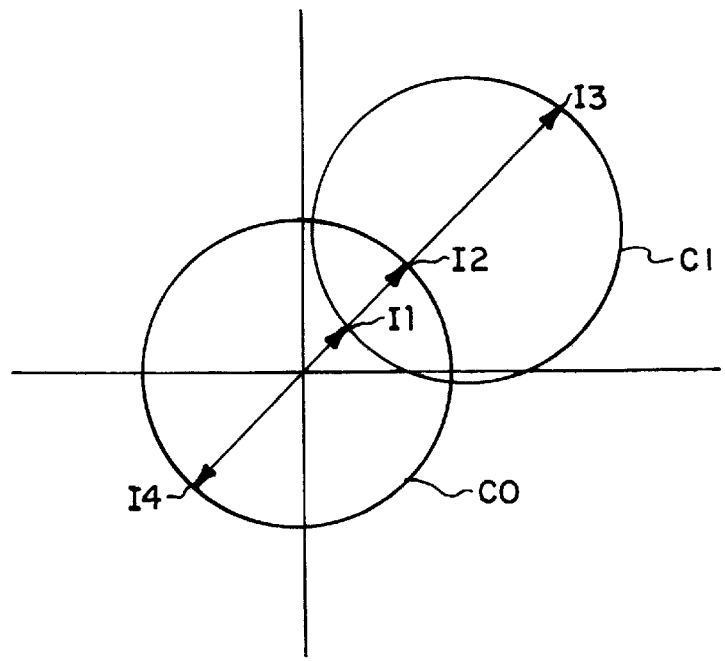
FIG. 1 is a diagram showing a potential problem in the prior art.

In its preferred implementation, in one aspect the invention consists of an electrical circuit containing magnetoresistive sensors, a microprocessor with memory and input/output devices enabling the receipt of data from other sensors such as a speed sensor or an accelerometer. The memory contains software algorithms, which perform the computation of accurate vehicle heading, automatic calibration of the magnetic sensors, and an algorithm, which computes the Flywheel position data from the integration of the various sensor data. In this respect, the term Flywheel is used to indicate a system, which operates through other sensors when a primary navigation system is wholly or partially inoperative, such as when GPS reception is blocked.

Magnetic heading sensors typically have problems associated with the induced and permanent magnetism of the vehicle on which they are contained. The magnetic signature of a vehicle will change frequently. Changes to the magnetic signature can come from a change in the shape of metal structures of the vehicle, introduction of a mass of ferrous material into a vehicle, such as a toolbox or cargo, and interference by magnetic fields such as the operation of electric motors and electric coils of various types.

Assuming no distortion from the vehicle on which they are mounted, two orthogonal magnetic sensors will trace out a circle centered at the origin as the vehicle turns in a complete circle, where the origin is defined as no magnetic field measured by either sensor. Permanent magnetism of the vehicle causes the readings of two orthogonal magnetic sensors to trace out a circular pattern, which ,s offset from the center. Induced magnetism arising from soft iron or other easily magnetized material will cause the circle to distort into an ellipse with the long axis in the direction of the preponderance of the easily magnetized material. Several patents have been issued which describe methods to calibrate the offset ellipse, which either dual horizontal-axis flux gates or magnetoresistive sensors trace out as the vehicle on which they are mounted turns a complete circuit. Hatch et al. U.S. Pat. No. 4,611293 and Hatch, U.S. Pat. No. 4,797,841 are two examples which are able to calibrate the compass in the presence of permanent magnetism in the vehicle and soft iron induced magnetism in any direction (i.e. the solution for the ellipse is entirely general.

Patents have also been issued which accomplish the same effect by using simplifying assumptions about the symmetry of the induced magnetism or about its existence. One patent, U.S. Pat. No. 4,953,305 van Lente, et al., allows a calibration to be performed in which the soft iron is assumed to be aligned in the direction of the longitudinal axis of the vehicle. This means that the semi-major axis of the ellipse is assumed to be aligned with the vehicle axis. This is generally not a bad assumption if the magnetic sensors are located near the centerline of the vehicle. Another patented technique assumes that the induced soft iron magnetism is negligible and the pattern is constrained to a circular fit, i.e. the ellipticity is zero. This is generally not a very good assumption, but for the accuracy needed for car navigation display only, it is generally good enough.

The parameters which must be determined in order to map the sensor readings to a circle centered at zero are: (1) the center offset in both the x and y axis; (2) if induced magnetism is allowed, the ellipticity of the sensor readings; and (3) if non-symmetry of induced magnetism is allowed, the angular direction of the semimajor axis of the sensor ellipse.

Patents have also been issued, e.g. Wanous, U.S. Pat. No. 5,046,031, which allow an automatic update of the calibration method using certain simplifying assumptions. For example, if it is assumed that a magnet in the same horizontal plane has disturbed the sensor readings, then the size of the circle to which the ellipse is mapped will not change and one can move the center offset to restore the same radial reading. However, this procedure will induce errors under certain conditions. First, if the disturbing magnet is not in the same horizontal plane as the sensors, the size of the circle as well as its center location may change. Second, if the vehicle location is moved sufficiently in magnetic latitude, the horizontal component of the earth's field either increases or decreases substantially and the size of the circle will also be altered accordingly. For these reasons a new automatic calibration procedure is invented which has the potential to automatically alert the user for the need to perform a new "assisted" calibration if the automatic calibration procedure indicates the need.

A new precision compass with an improved automatic calibration procedure is disclosed with several advanced features, which make it ideal for those applications, which need high accuracy heading information It can be used as a stand-alone compass or it can be integrated with other on-board sensors. In a more fully developed navigation and location system with a radio navigation system such as GPS, the compass and other on-board sensors define a highly integrated system.

This device makes a Flywheel due in part to the fact that we get multiple sensor readings per second. Current implementations have used five Hz. to six Hz. up to 12 Hz. (readings per second) updates. The use of this instrument with a speed sensor input provides an excellent aid to an otherwise GPS only navigational solution. This instrument makes an excellent low cost sensor because it is accurate, self-tuning, and provides data at a high update rate.

At the heart of the new compass is a pair of orthogonally placed magneto resistive sensors (MR sensors). The output of these sensors is much like that of the flux gate sensors to which Hatch (U.S. Pat. No. 4,797,841) has provided an algorithm for calibrating the sensor in the presence of local magnetics. The MR sensors are sufficiently sensitive to measure a rotation of the MR sensors within the earth's magnetic field to within one degree. Via the application of Hatch's algorithm and through software smoothing of the raw inputs from the two orthogonal sensors we can achieve a highly accurate direction sensor.

Automatic Calibration Procedure

In order to make this tool useful in practice there is a need to automatically calibrate the sensor data. This is because the changing of the local magnetic fields can alter the perceived direction. The technique used for automatic calibration is described below.

Auto calibration occurs in two distinct steps:
1. Constantly adjust the offset parameters similar to the manner described in the Wanous U.S. Pat. No. 5,046,31.
2. When enough data is collected, as described below, apply the complete calibration algorithm.

Constant Adjustment Of The Calibration

One step in automatic calibration is to adjust the offset parameters in a manner similar to that described in Wanous, U.S. Pat. No. 5,046,031. The constant adjustment to the offset parameters is based upon comparison of the computed radius from current data with the known radius provided from the calibration terms. (To reduce the computational requirements the square of the radius can be used rather than the radius.) However, simple application of the techniques described in the Wanous patent allows for errors to be made in the offset adjustment. FIG. 1 will aid in describing the potential problem. Consider the circle labeled C0, this represents the unperturbed raw data, as it would look after being re-circularized by applying the fit parameters. The circle labeled C1 is how the "after the fit" data may appear if a magnet were placed near the sensors. Now assume the vehicle was pointing SW. This would provide an (x, y) pair at point r1. The radius comparison technique would compare a radius of r1 to that of r2 and find (by getting the components of r2) that the data had shifted down and to the left. This is quite wrong, (in general this error will be wrong by shifting the data the wrong direction by 2*radius) the data has in fact shifted up and to the right as we would have correctly computed had the vehicle been pointing NE.

The problem is that the data is ambiguous, both r1 and r3 appear to be points representing NE. Although the present algorithm may make this mistake, it will only be temporary because as more data is collected we will discover the mistake we made and correct it. Every time we collect an additional 25% of the data we reexamine the consistency of the data by computing the radius using the current fit parameters on a previously saved data pair and comparing that to the radius computed using the most recent data. If the difference between these two radii exceeds a predetermined selected threshold, the data is thrown away and the automatic calibration is restarted. It is desired to examine the data and detect the problem as early as possible. Twenty-five percent is selected because it usually will sufficiently define the general structure of the ellipse to determine if the data should be retained or rejected. Less data may suffice, and more data will do the job but will delay the rate at which calibration parameters are updated. The minimum data is that needed to define the general structure of the ellipse. This solves the problem just described as well as the problem of mixing data from two different local magnetic inputs.

The potential for this problem is minimized too because until the offset is greater than the original radius (r2) the problem of ambiguity does not occur. Because we take measurements at approximately 12 Hz, and we recompute the is offset with each measurement, the perturbation of greater than 1 radius must occur within approximately $\frac{1}{12}$ seconds. Otherwise we will keep up with the movement and not enter into the ambiguous state.

The computation of an automatic complete calibration is based upon the following scheme. The current data is catalogued in order that the software is aware when the vehicle has undergone a 360° rotation. Anytime sufficient new data is available a new calibration will be performed. In this patent, we propose a new way to catalog the data, which under normal circumstances provides a better way to detect when a full rotation has occurred and that an automatic calibration can be performed. Data is automatically collected and stored for a new calibration anytime the automobile ignition is turned on. In order to avoid mixing data obtained from different local magnetic environments, the automatic adjustment of the offset parameters is monitored. If the difference in the radius of the circle from the current data exceeds a threshold value, (for example, one-half the value obtained from the last complete calibration).

The automatic calibration procedure is designed such that the operator generally need not perform any special procedures at all.

In addition, to a solution of the ellipse parameters, the rms residuals of the fit will be computed. If the rms residuals remain below a selected threshold the parameters of the calibration may be assumed correct and could be used to map the sensor readings to the centered circle from which the heading is computed. If the residuals exceed the selected threshold a user message could be transmitted requesting that the vehicle be turned in a complete circle to update the sensor data. Once the turn is completed, the least squares fit to the ellipse will be re-computed and, if the rms residuals are good, the new calibration parameters will be employed.

Two additional techniques are applied to provide more accurate results. First. applying a moving average to the raw (x, y) pairs smoothes the raw sensor data. The second technique is to provide the calibration algorithm with as much data as possible. The calibration applies a least squares fit to the data provided. Clearly then, the more data that is provided, the better the fit. One of the keys to the least squares algorithm is the computation of (Ht H) (read H transpose H) which is the product of the transpose of the observation matrix H times the observation matrix H. In this application H is an "n×5" term matrix. Where "n" represents the number of measurements. Traditional techniques would have to store n*5 terms in order to provide the data for the fit. By computing HtH and Hty "on the fly" we are not required to store the individual data points and may therefore use all the data available, thus providing a better fit.

Including Speed Sensor Algorithms

A new Kalman filter scheme is proposed for including speed sensor data into the "GPS Flywheel." Various speed sensors can be included into an automobile navigation system. Of particular interest are those sensors, which can aid the navigation while GPS signals are missing for short intervals. Such sensors may include, but are not limited to, the odometer speed or other drive shaft sensors, wheel turn rate sensors, Doppler radar speed sensors, or even accelerometers which can be integrated to give the vehicle speed.

The essence of this aspect of the new invention is to tailor the Kalman filter such that it can make optimum use of the associated speed and heading sensors. Specifically, the states included in the Kalman filter will include two horizontal position states in which the coordinate system is not critical. The third position state will be the vertical position. Also included will be the GPS receiver clock time and clock frequency states. The velocity states will include the speed in the vertical direction, the heading of the vehicle and the along track speed of the vehicle. The specific choice of these states makes A possible to easily reconfigure the Kalman filter whenever GPS satellites are lost such that the system accuracy will degrade only slowly. Thus, when the number of GPS satellites drops to three, the vertical. Velocity State will be slowly changed to zero, i.e. to a height hold mode. When the number of satellites drops to two, the absolute readings from the GPS code measurements will be dropped and only the change in the carrier-phase measurements will be used. Furthermore, the carrier-phase measurements will not be used to feed the heading state. The heading state will be driven entirely by the magnetic heading sensor. When the number of GPS satellites drops to one, the GPS measurements will be used only to update the GPS receiver clock Frequency State. Whatever speed sensor is available will be used to drive the along-track Speed State. The magnetic compass and cross-track accelerometer will be used to drive the heading state. The standard time update process will obtain the position states.

In addition to the standard eight states of position and velocity described above, calibration states will be added for appropriate calibration of the speed and heading sensors. The magnetic compass will include a state, driven by the GPS measurements, which will determine the magnetic declination, i.e. a calibration value for the magnetic compass. If an odometer or wheel sensor is used, two or more calibration states might be included which give a speed scaling value to bring the speed measurements into agreement with the GPS derived speed. Different scaling values might be needed as a function of the vehicle speed (i.e. excessive wheel slippage at high speeds).

It is believed that the Kalman filter, with the states designed as described above, represents a unique configuration especially adapted for use as a "GPS Flywheel" system particularly well adapted to determining an estimated position in the absence of sufficient GPS satellite measurements to obtain a standard GPS position fix.

Referring to the above, when GPS reception drops to three satellites, altitude hold is in place unless, for example, an altimeter is used to substitute. When GPS reception drops to two satellites, the magnetic compass and the cross-track accelerometer operate to provide heading. Also, redundantly, an angular rate sensor could be used. Therefore, including a graduated integration of inputs, as the accuracy of one sensor degrades, other sensors are used. When GPS reception drops to one satellite, only time is obtained and therefore, the other sensors are used for speed, decoding and plotting position.

Additional Description

The magnetoresistive sensors employ a bridge circuit polarized so that it is directionally sensitive to magnetic fields so as to measure the strength of the field. When mounted on a vehicle the sensor measures the Earth's magnetic field and deviation magnetic fields caused by local conditions, which may be from the vehicle or the adjacent area. This results in a compass direction from the magnetoresistive sensors.

The output from the sensors, a voltage, corresponds to the angle of the sensor with respect to the magnetic field imposed upon it. This gives the direction. Two orthogonally oriented magnetoresistive compasses are needed to resolve direction of rotation. In the system, the output voltage is translated into a digital valve.

In the system, however, a different type of sensor could be used, such as a flux gate compass, or a Hall effect sensor, to give the unique angular position so long as the necessary angular discrimination is available, the magnetoresistive type sensor being one desirable type which can produce the desired directional signal. The employment of magnetoresistive sensors is known in the prior art.

In the system, there is a new way of cataloguing data. Each sensor reading produces an x, y coordinate which when the vehicle is driven in a circle, will produce a circle or more generally an ellipse, which will be offset from the center of the coordinate system due to the local magnetic anomalies. As in the past, it is an object of the present system to adjust for the magnetic signature of the vehicle, as well as for any changes in the magnetic signature of the vehicle. Also, the present invention addresses the problem of transient magnetic anomalies. In particular, in an aspect of the invention, transient magnetic anomalies are detected and rejected so that the system will continue to provide correct headings, even during the presence of the transient anomaly.

In the prior art, the circle or ellipse is shifted to the center of the coordinate system by applying current to a coil to change its offset, to put it around the origin. In the present invention, the ellipse is circularized mathematically, so the sensor readings are not adjusted.

The radius of the circle is proportional to both the semi-major axis and the semi-minor axis of the ellipse. Thus, a big ellipse would give a big circle. The larger the circle, the greater resolution will be available. The limiting factor of the maximum size is the dynamic range of the ADC's in the microcontroller. With a very small radius it is impossible to determine heading due to noise. The compromise radius is between 100–200 counts to obtain quality headings without approaching the limit of the dynamic range of the ADC's. As a start-up procedure, the radius is tested to determine if it is within the desired range and the pulse width modulation is adjusted to achieve the desired range.

In summary, the calibration process as described herein has the following general steps:
1. Collect data;
2. Run the calibration algorithm to define the ellipse, and obtain the calibration terms, the parameters for the ellipse. This step has two steps which are (a) every data point which is to be used will be processed to update the observation matrix and (b) finish the calculation to obtain the parameters for the least square fit ellipse;
3. To get headings, use the obtained calibration terms found to circularize the heading data; and
4. Compute a heading.

The mathematical process for converting data points on the ellipse to points on a circle is shown in Hatch U.S. Pat. No. 4,747,841, the content of which is incorporated herein and which is attached as Appendix "B," and which is generally referred to as circularization by least squares, or more concisely, circularization. In an aspect of the present invention, the Hatch circularization by least squares is performed by a particular chosen procedure, in short, providing data serially, as can be seen in the software listings, so as to avoid the need to collect and retain all the data. With circularization, heading may be measured.

Data is gathered to use in the calibration process. The data is employed in a procedure referred to as "binning," or the "bin process." In this process, it is necessary that the vehicle be driven in a circle in order to gather data around a complete rotation, which is necessary for calibration. In the known systems, compass calibration is performed by the common procedure to simply drive the vehicle in a circle, taking data, and using whatever system is to be employed. This is referred to as manual calibration. In the present invention a novel procedure for automatic calibration is described. The process of completing calibration as described herein is applicable to both manual and automatic calibration, but is particularly advantageous as applied and making possible the automatic form of calibration.

An important element that makes the procedure practicable is the frequent acquisition of readings from the sensors. An exemplary data rate is 12 Hz, that is, twelve readings per second. The limit of data rate is constrained by the processing power of the associated computer and thus could be very high. But a very high data rate would not improve results. The lower limit will effect the fineness of accuracy. The present method uses a smoothing technique, which will adjust for noisy readings. It is necessary to collect data fast enough to smooth out noisy measurements. Also, a lower limit is driven by the need to record motion of the vehicle in a timely manner, which is influenced by the speed of vehicle. A lower limit of about 5 Hz is available for good results for general-purpose land vehicles, such as cars and trucks on typical roads and highways. Thus, to some extent the results will be effected by the speed of the vehicle through turns, which in turn relates to bin size, as will be seen.

In the binning process the theoretical circle resulting from the circularization procedure is divided into segments of equal size which define equal portions of the circle, recalling that every reading (except those rejected for being invalid) is circularized to fall on the circle, and therefor into one of the segments.

SOFTWARE DESCRIPTION

In a preferred embodiment the computer is programmed with fifteen subprograms, which are shown in Appendix "B." The functioning of these programs is explained in the flow diagrams of FIGS. 2A–2L. The software is used in conjunction with the electronic circuits of FIGS. 3A–3D and 4A and 4B.

Figure 2A:
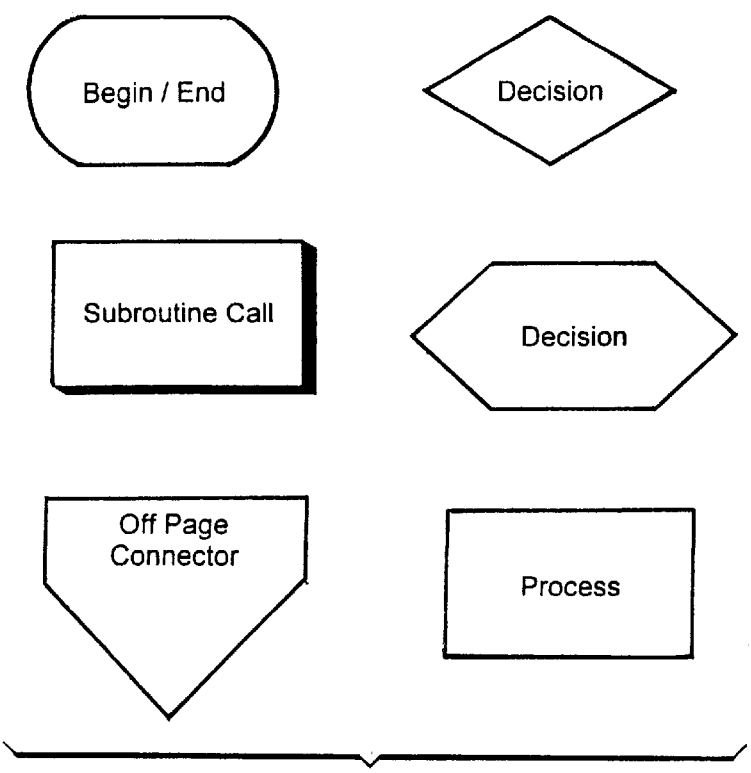
FIG. 2A is a guide to the symbols used in the software flow charts, as shown in FIGS. 2B–2L.

FIG. 2A shows symbol definitions to assist in interpreting the flow diagrams.

FIG. 26 is the flow diagram for the start-up routine 200. Optionally at 202 a communication mode may be implemented. For example for testing, monitoring or modifying the program, a communication mode may be desired. At 204, the subroutine Load From EEROM is called to provide calibration values stored in the EEROM. These are either from prior sensor readings or a default set. At 206, the calibration terms are organized in a structure and stored at 208. There are five calibration terms: x offset, y offset, flattening, and sine of the angle of rotation and cosine of the angle of rotation. Next, at 210 the smoothers are initialized. The smoothers is a program to calculate a moving average for the x and y data readings.

At 212, the jitter tune values for detecting transient anomalies are the jitter threshold and sequence lengths. The jitter aspect of the invention is involved in the detection and rejection of transient anomalies, as will be described in further detail below. Jitter threshold and sequence length are the selectable variables for the process. These are set to default values, or they can be selected. At 214, the first 20 (or other selected number) readings are discarded to ensure that there is no power-on hysteresis error. Then, at 216, the smoother array is filled and ready to perform the moving average calculations. Each moving average is used to calculate heading unless discarded as anomalous as detected by the jitter detection procedure. In the exemplary system, six readings are used for the moving average- The number of readings for the moving average can be varied, and is selected as a function of the rate at which measurements are being taken. In the exemplary case, readings are being taken at the rate of 12 per second. The reading rate in turn depends on the expected speed of the vehicle. For higher speeds, fewer samples would be taken. At 218, there is a step to give sufficient resolution to determine readings. At 220, there is a step to ensure consistent readings.

Figure 2C:
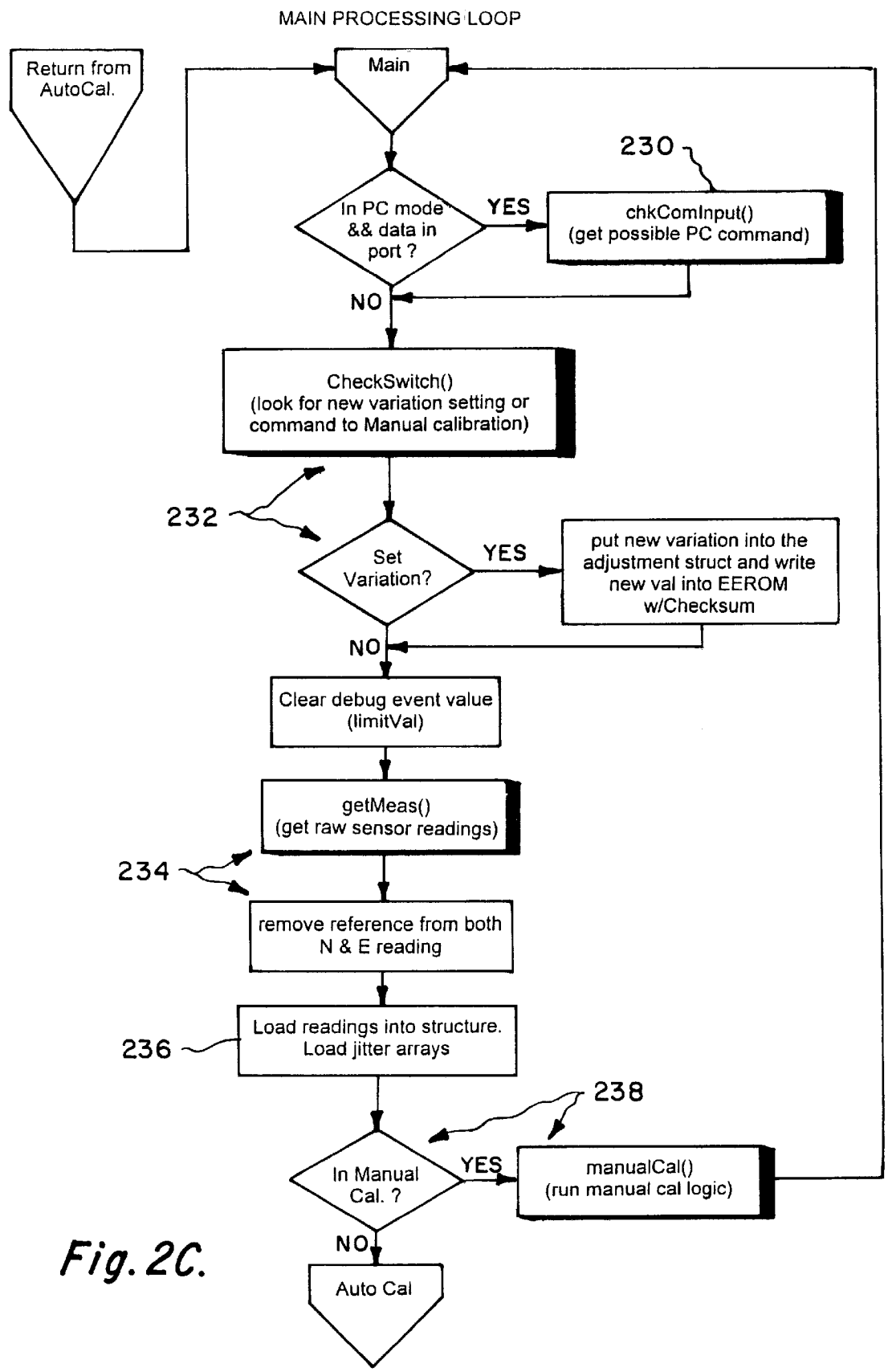
FIG. 2C is a flow chart of the main processing loop portion of the software.

FIG. 2C is the flow diagram of its Main Processing Loop for performing calibration. As noted above, there is an optional communication link at 230. The variation setting steps 232 allow selection of the magnetic north declination for the geographical area of the current operation. At 234, the sensor readings in digital form are received from the subroutine, and the reference voltage is removed. At 236, the readings are loaded into the data structure and the jitter arrays are loaded. At 238, the normally automatic calibration will run unless the user selects manual calibration.

Figure 2D:
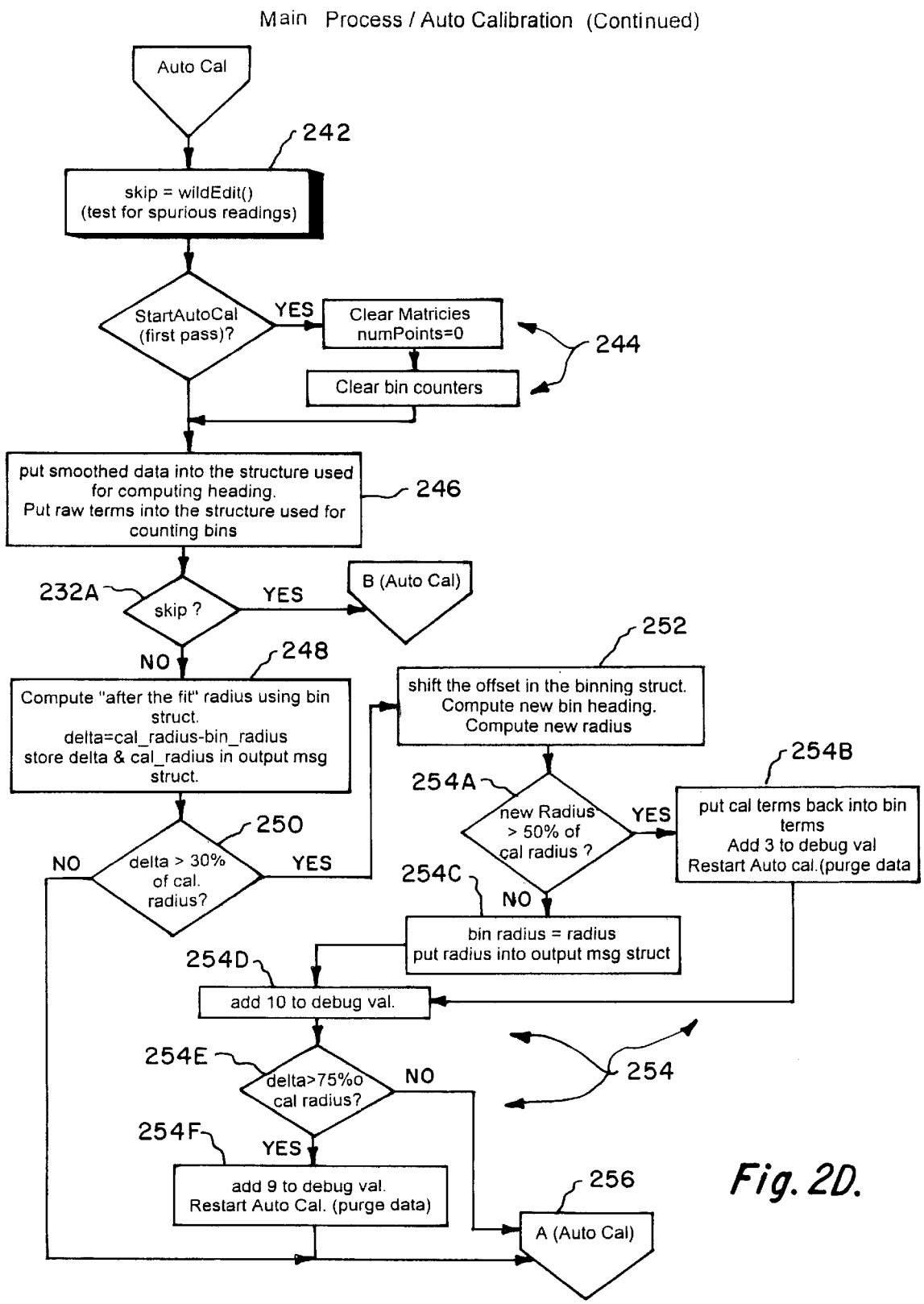
FIG. 2D is a flow chart of a continuation of the main processing loop portion of the software.

FIG. 2D continues the Main Processing Loop. To effect automatic calibration, the vehicle must be driven in such manner that a full 360° is turned in order to obtain readings to define a full circle (or ellipse) and to provide at least one reading for each bin. But the driver need not be conscious of this requirement, as the normal driving will collect data for the bins, and the automatic calibration will be effected when there is at least one reading in each bin. First, at 242, the Wild Edit subroutine is performed to eliminate spurious data, which is executed below at 232A.

Next, at 244, the matrices and bin counters are cleared. Then, at 246, the smoothed data is put into the data structure used for computing headings. Also, the new terms are placed in the data structure for bin recording. In the exemplary case, thirty 12° 1 bins are used. The bin size is related to the anticipated speed of the vehicle in a turn. The exemplary system takes readings at the rate of 12 per second. This is a good rate for general vehicles on roads and highways. The reading rate may be determined by the circuit, but It must be fast enough to recognize that the vehicle is performing a turn, as this wall affect the quality of the resulting output to the user. The variables are the data-taking rate, the speed of the vehicle and the number of bins. In the present example, there must be at least one data point in each bin to qualify the data set for an automatic calibration. Thus, a minimum of 30 points will be used, although there will rarely if ever be so few. Consequently, if the vehicle turns so fast that the readings skip a bin, then no automatic calibration will occur until that bin has been filled by the vehicle being on the heading for the omitted bin during driving. Even though 12° bins are quite a small angle, readings at 12 per second generally ensure that a vehicle will obtain enough readings during a turn. For example, if a 90° turn takes one second, there will be 12 readings for the 7 or 8 bins. It is also appropriate to have a maximum limit of readings for each bin, 25 having been selected in the exemplary system. At 248 the circularization algorithm is applied to get the radius of the circle. This provides a minimum rate of bin content of 1:25 in the exemplary system. It has been determined that a ratio of over 1:100 can undesirably distort the ellipse.

The step at 250 determines if the data is inconsistent by a selected amount, 30% being selected. If so, at 252, the offset is shifted and a new heading is calculated. The general offset concept is discussed in the Wanous U.S. Pat. No. 13 5,046,031; its particular implementation with modifications is shown in the listings of Appendix "B." If the delta is acceptable, then the process proceeds through 254 to FIG. 2E. If the 250 delta is not acceptable, then in the steps at 254, *a–f*, a check is made to see if the result is better or worse. The restart action has concluded that there is a big anomaly in the vehicle such as a large new magnetic event requiring re-reading of the magnetic signature of the vehicle. Otherwise, the conclusion at 254*e* "No" is to continue with Auto Cal. (256).

Figure 2E:
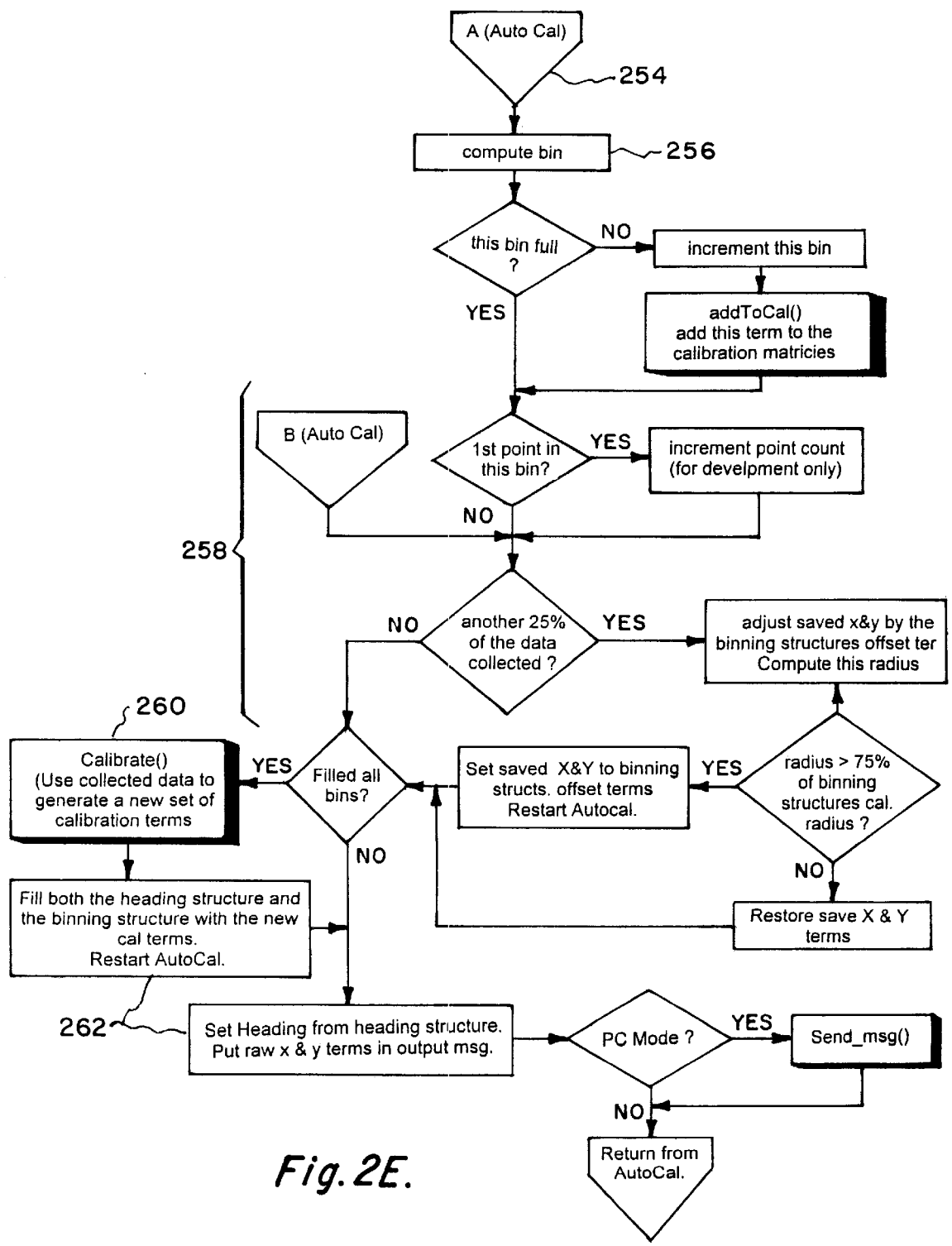
FIG. 2E is a flow chart of a continuation of the main processing loop portion of the software.

Referring to FIG. 2E, the automatic calibration procedure progresses. At 256, each incoming signal is identified to its bin. At 258, the process of validating the usefulness of the data and creating the matrices is performed. It has been selected that a consistency or validity check will be done when 25% of the bins have data, in this case, 8 bins. A second check is done for another 25% of the data. Also a check is done to determine if the shift is too great. With this verification successfully completed, one of the matrices filled, the Hatch algorithm is applied at 260 and at 262 the heading is calculated and stored.

Figure 2F:
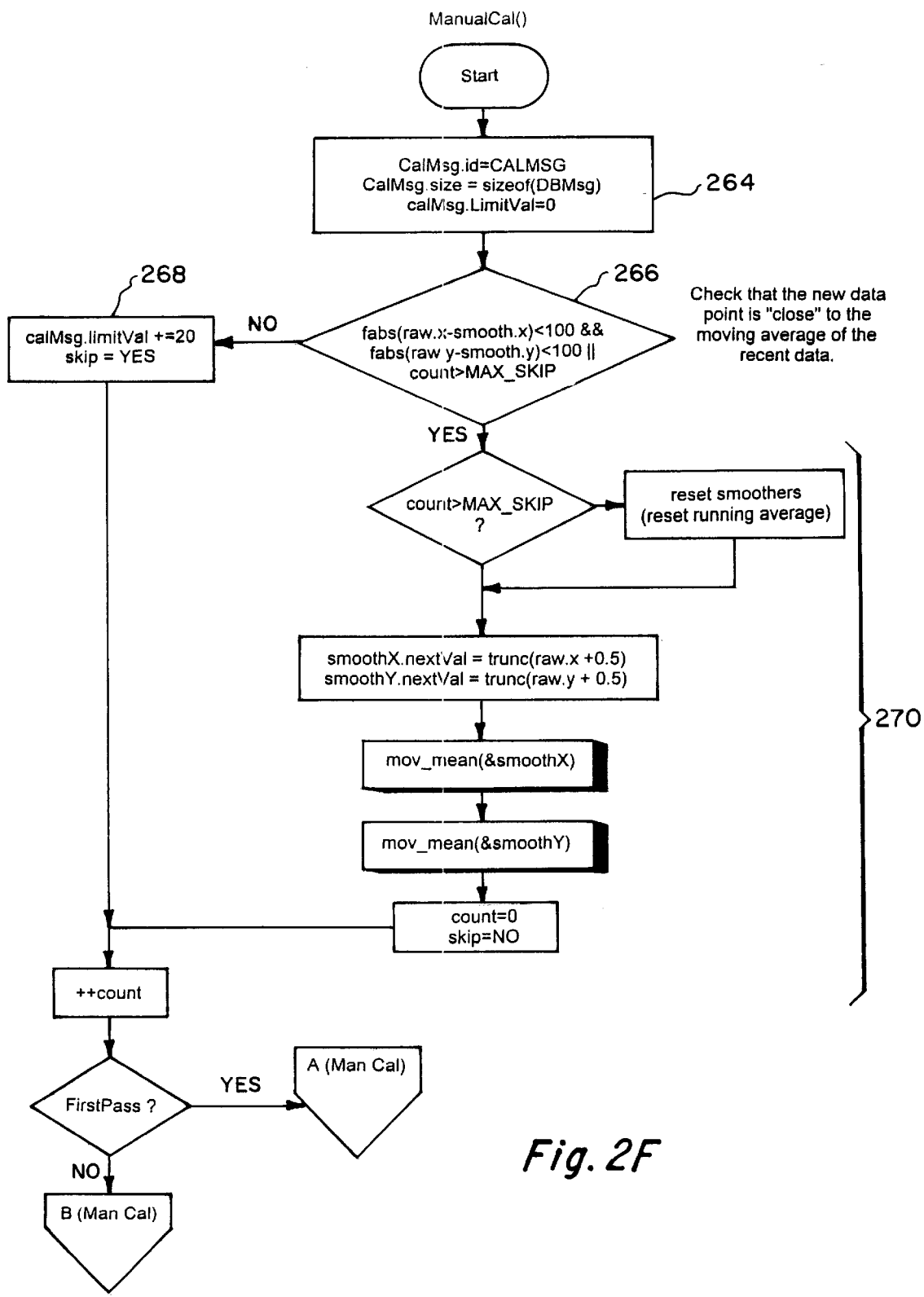
FIG. 2F is a flow chart of the manual calibration portion of the software.
Figure 2G:
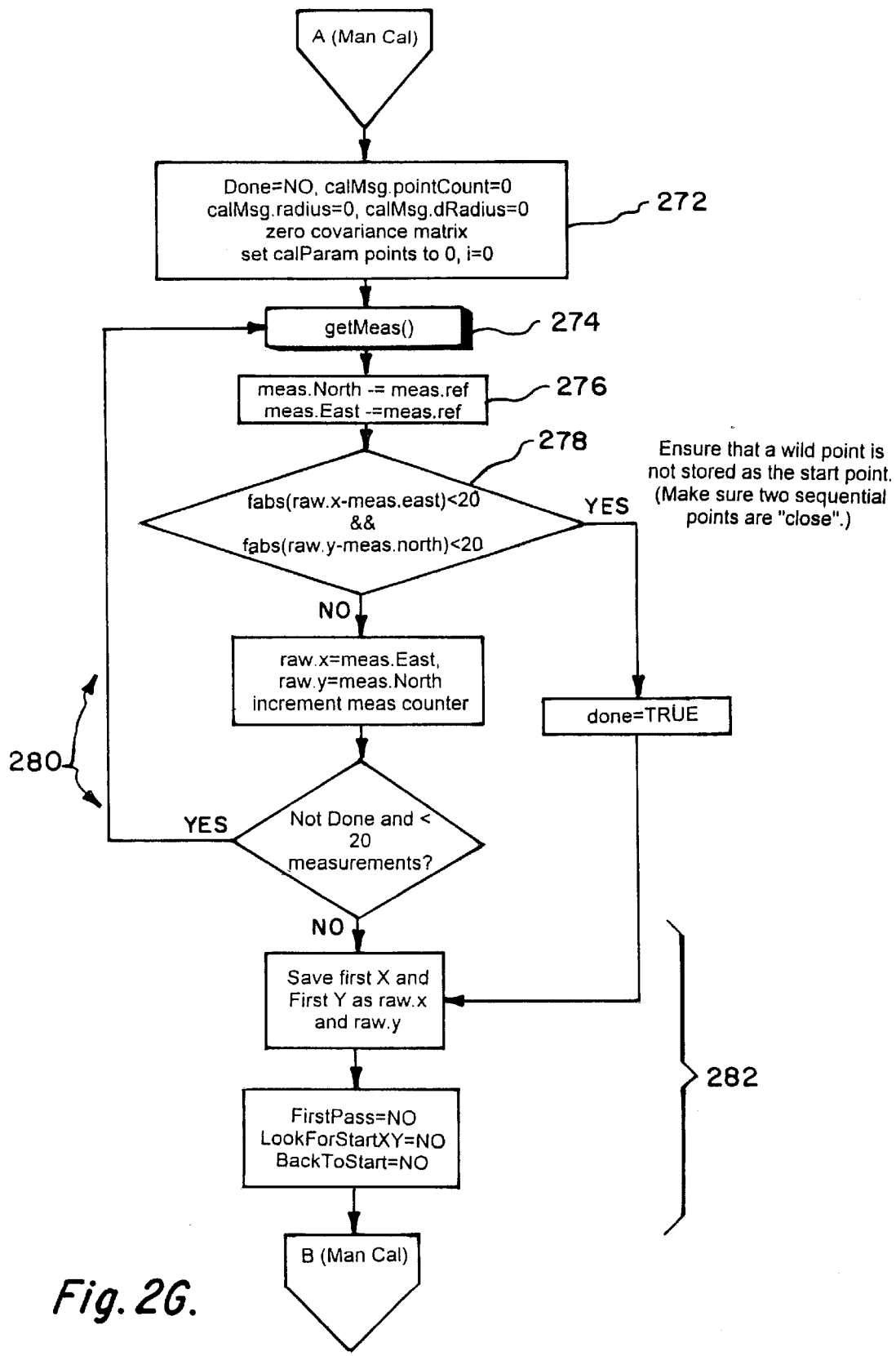
FIG. 2G is a flow chart of a continuation of the manual calibration portion of the software.
Figure 2H:
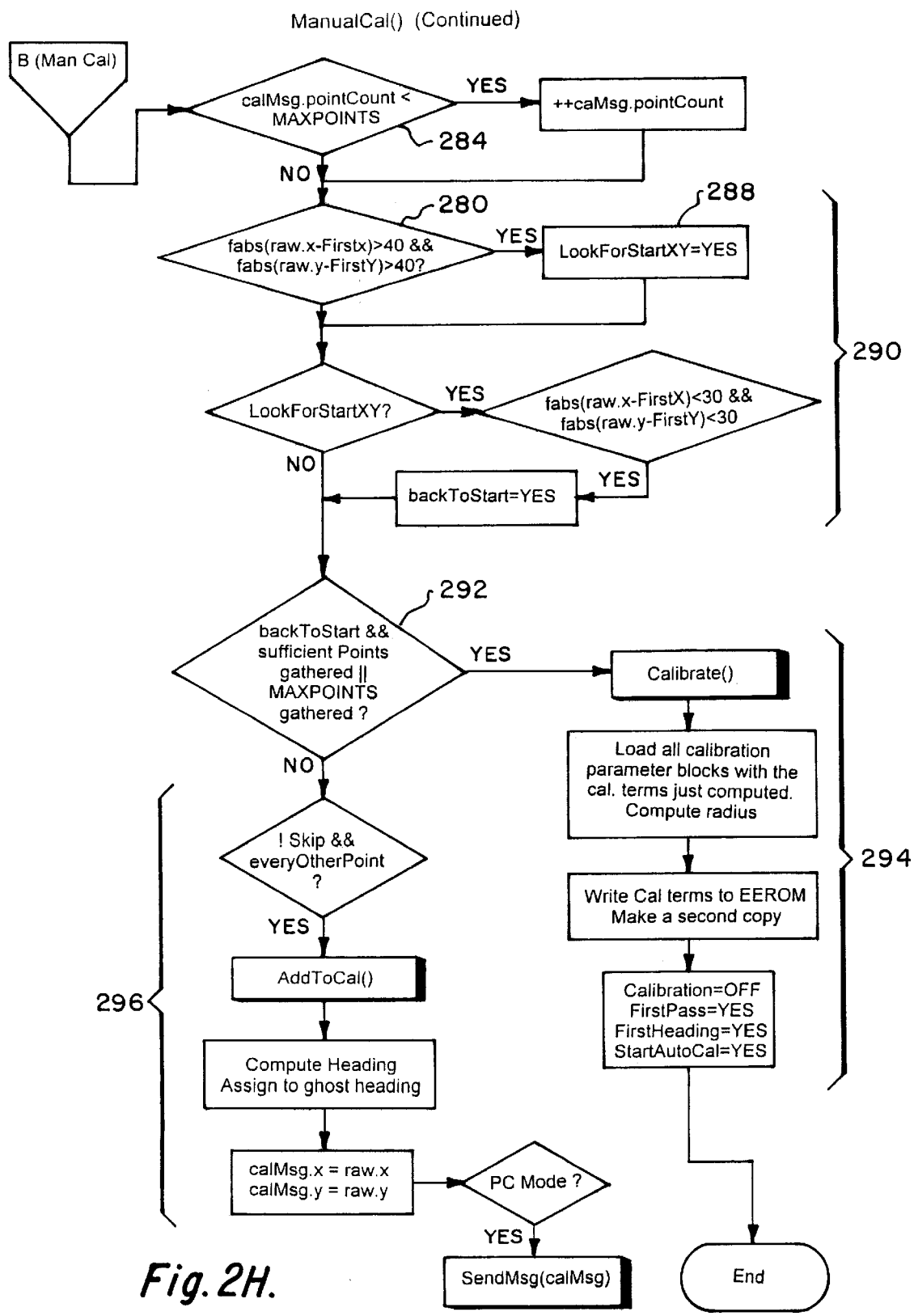
FIG. 2H is a flow chart of a continuation of the manual calibration portion of the software.

Referring to FIGS. 2F, 2Ghth and 2H, manual calibration procedure is shown. In this case the binning process is not used. It is assumed that over the short time needed to drive the vehicle in a circle, magnetic changes will not occur. First the original x–y data pair is saved, and the circle-rive is executed until that pair is reached again. Block 264 sets up the debug message. At 266, a check is made that from the data history the smoothed data and the raw data are close. If they are not close the process of 268 and thereafter is executed. If the data is good then the process at 270 is performed. The data is used either because it is good date, or if it's bad but coming in for a long time it is allowed in and used to do the smoothing step. Although the purpose is to discard bad data, the high frequency of data readings works favorably. For example, in 2 seconds, the procedure will look at 24 data points. This is done continuously, so if all the past data points are bad the process starts using them.

At 272, the process of initializing the calibration gathering terms is started, at 274 the sensor data is obtained, and at 276 the referenced voltage is removed. At 278 a verification check is made to ensure that the last two measurements are close and if not, the process re-loops at 280. Otherwise, the procedure continues at 282.

At 284, look to see if maximum allowable points have been gathered (in case a full circle has not been driven). At 286, check to see if the vehicle has moved away from the starting point, if so make note of it at 288. Block 290 asks if the vehicle has returned to the starting point. At 292, if the circle has been driven a full circle or the maximum number of points have been gathered then at 294, the calibration algorithm is preformed. If "No," at 292 then at 296, use the data point to calculate a heading.

Figures 1, 2I:
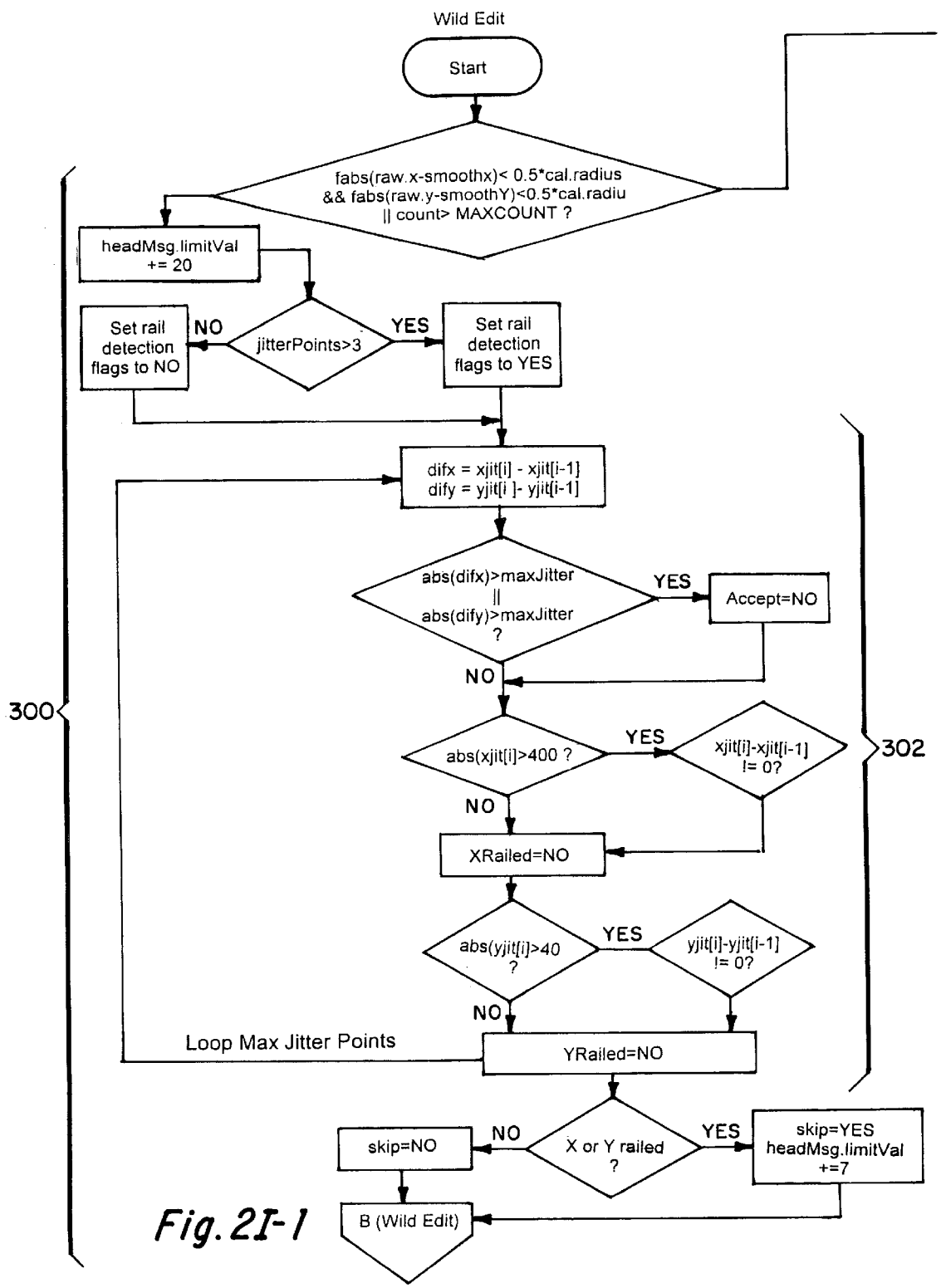
Figures 2, 21:
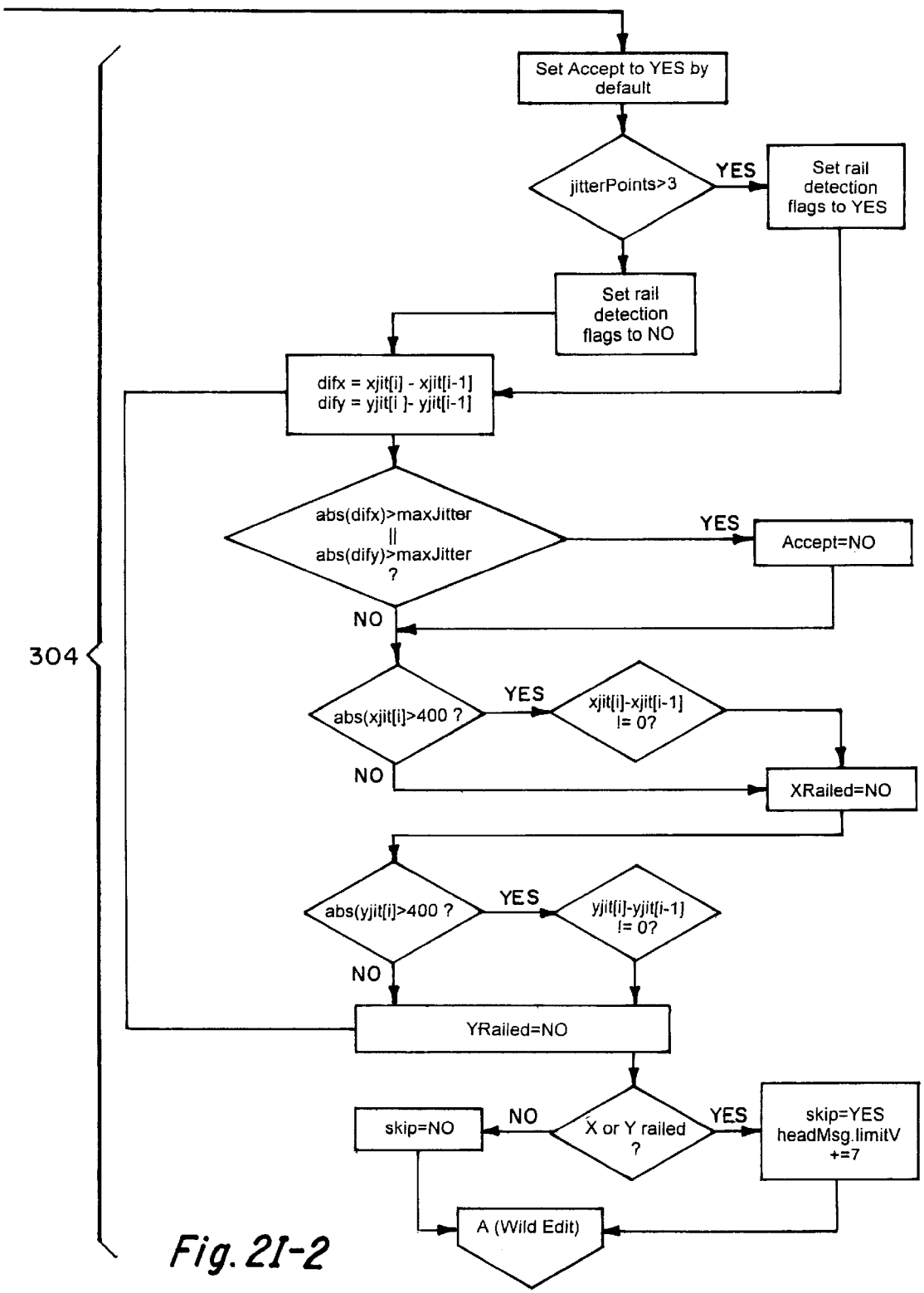
FIG. 21 is a flow chart of the Wild Edit portion of the software.

FIG. 2I shows the Wild Edit flow chart which is for the purpose of discarding bad data. At 300, the data has been found to be bad, so it will not be used but will still look for jitter. The raw data is too far from the smoothed data, we have detected a jump in the data (more than half the radius is the selected text). Even though it will be disregarded for calibration and heading purposes it will be examined to see if there is jitter. The blocks 302 are looking for jitter. At 304, the data has been accepted and also examined for jitter.

Figure 2J:
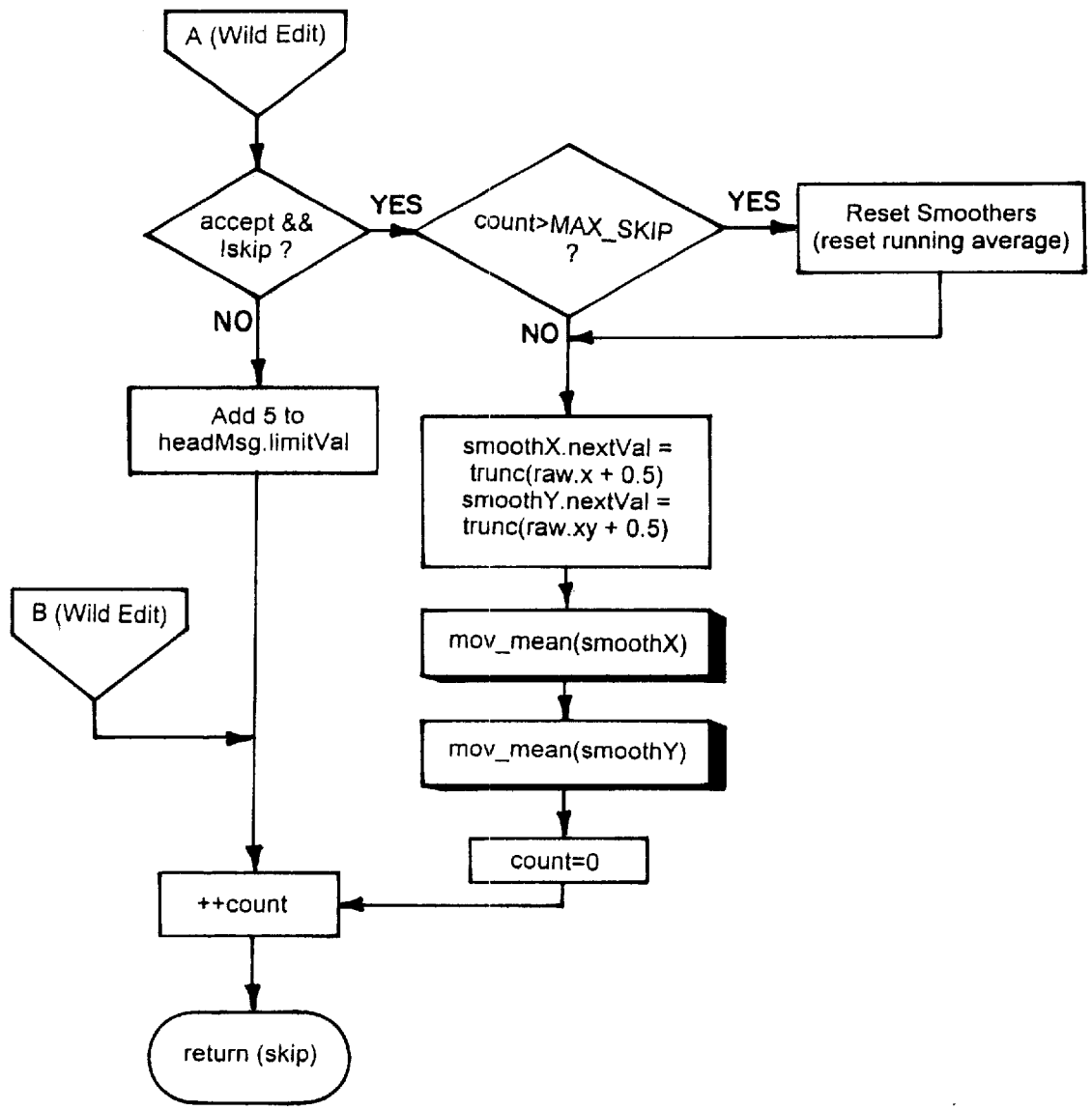
FIG. 2J is a flow chart of a continuation of the Wild Edit portion of the software.

FIG. 2J shows that the accepted data is smoothed.

Figure 2K:
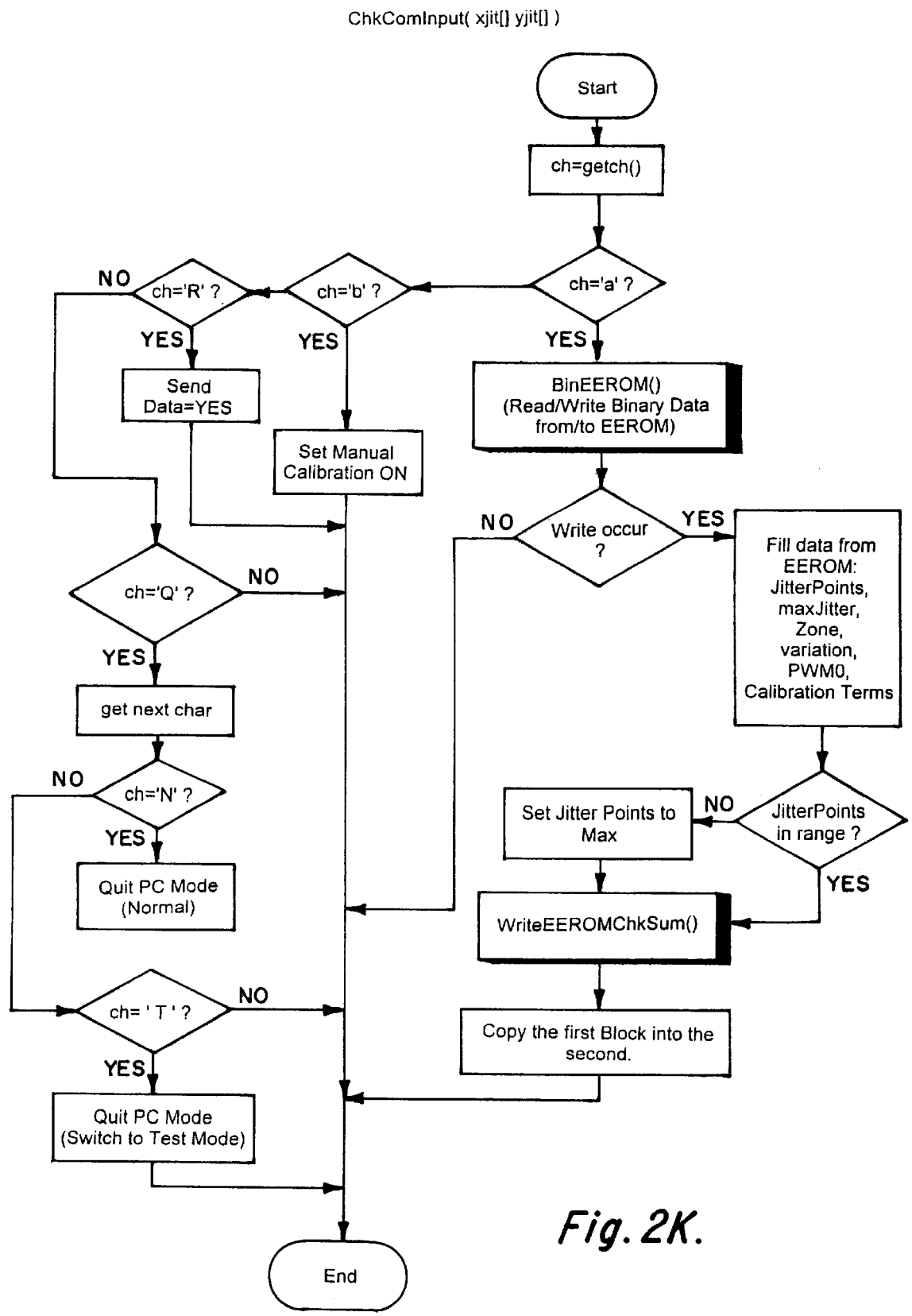
FIG. 2K is a flow chart of the Check Communications Input portion of the software.

FIG. 2K is the process that looks for PC commands and listens for and responds to PC commands.

Figure 2L:
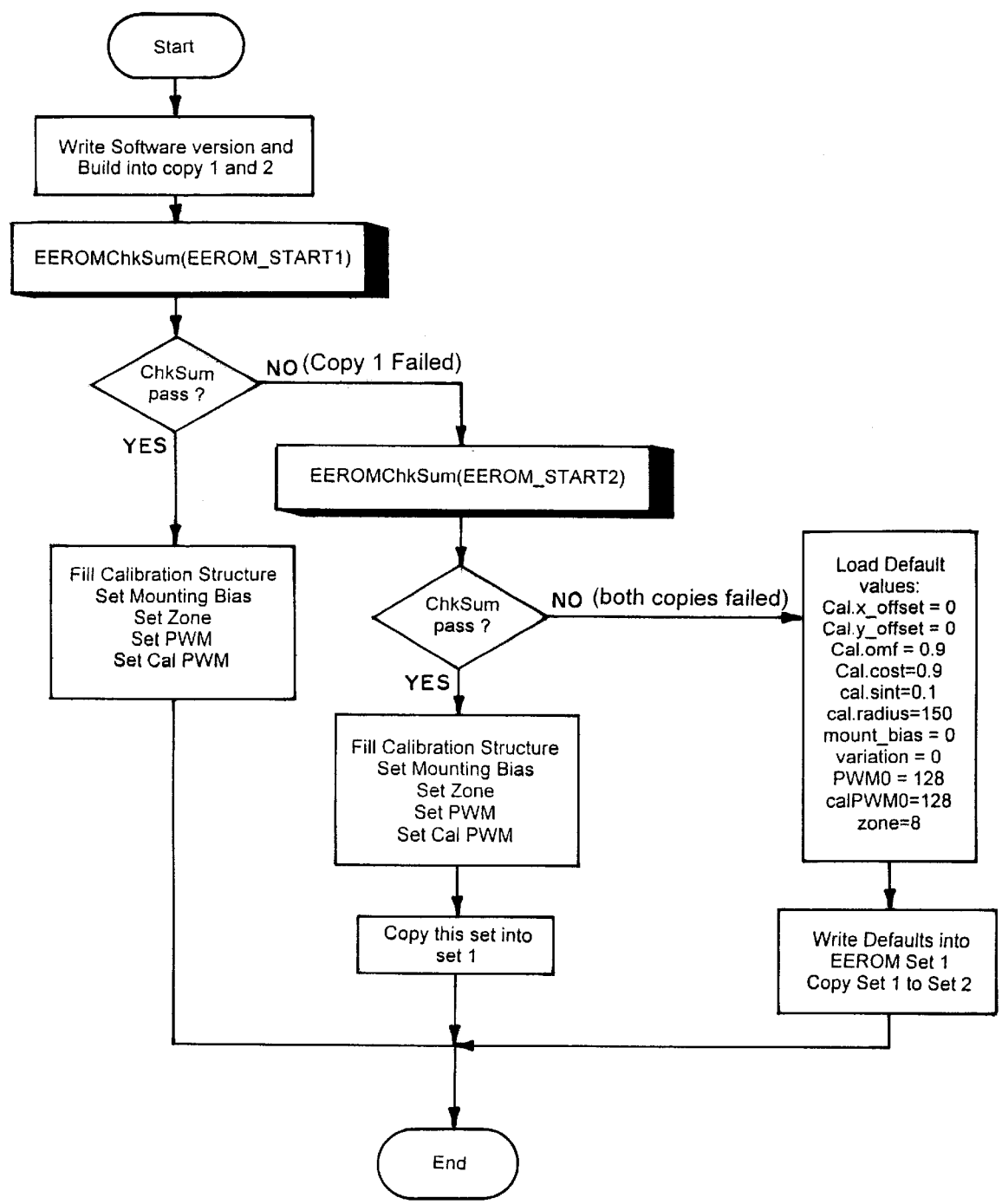
FIG. 2L is a flow chart of the Load From EEPROM portion of the software

FIG. 2L shows the system initialization procedure and loads from the EEROM.

HARDWARE DESCRIPTION—CIRCUITRY

The hardware and circuitry are shown in FIGS. 3A–3D.

A small, low-cost magnetic compass implemented with electronic circuitry is described. This compass is suitable for use in vehicles or other applications suited to a magnetic compass (e.g. boats). The compass is operated in alternate set/reset modes. The compass is provided with a means, implemented in hardware, of eliminating measurement drift, due to changes in operating temperature, that affects compass accuracy. In conjunction with mathematical calculations performed by software, a means is provided for eliminating the perturbing effects of external magnetic influences, which degrade the accuracy of standard magnetic compasses when used in proximity to large metal objects.

The compass described uses magnetoresistive sensors to measure the alignment of the compass with respect to the Earth's magnetic field.

The sensor is composed of four magnetic sensing elements, which change their resistivity upon application of an external magnetic field, arranged in a standard bridge circuit. The arrangement of the sensing elements is such that there is a "sensitive" measurement direction (or orientation), with respect to an applied external magnetic field. The bridge is excited by an external voltage, and with no component of an external magnetic field applied in the sensitive direction, the bridge is balanced and produces no output. Upon application of an external magnetic field in the sensitive direction, the bridge unbalances, producing an output voltage proportional to the applied magnetic field. As the sensor (and thus the sensor's sensitive direction) is rotated within a magnetic field, the output voltage of the bridge varies sinusoidally with changes in the sensor's angular orientation with respect to the external magnetic field.

The sensor is provided with a means of flipping the polarity of the measurement output, allowing the sensor to be used in a "set/reset" mode. That is to say that the sensitive direction of the sensor bridge can be reversed. This polarity reversal provides a means of removing biases in the sensor bridge's output caused by manufacturing tolerances and other error sources. Only the polarity of the output signal is flipped, and not the error voltages. The flipping action has the effect of transforming the actual measurement output into an alternating current (AC) waveform, while error voltages remain direct current (DC). Standard filtering circuitry can then be used to separate the two signals. The sensor's DC error signal can then be removed from the output by means of negative feedback techniques.

The flipping action is caused by pulsing a "flip coil" located with the sensor package. A positive current pulse of very short duration (on the order of 10 $\mu S$) causes the sensor's sensitive direction to be aligned in the "normal" orientation. A negative current pulse causes the output of the sensor to very quickly reverse polarity. By applying current pulses alternately in each direction at some regular rate (typically from 1 kHz to 1 MHz), the sensor's measurement output is changed to an alternating signal whose peak-to-peak amplitude is a function of the applied magnetic field.

The sensors may also provide a "compensation coil," although its use may be omitted. In the preferred embodiment the compensation coil is not used because the compensation for external perturbing influence is accomplished by the software. This is a coil located within the sensor package, in close proximity to the sensor bridge, which can induce a magnetic field measurable by the sensor bridge. One use for this coil (and the genesis of its customary name) is for compensation of external perturbing influences. A current is passed through the compensation coil in opposition to the perturbing influence, effectively removing it from the measurement output.

Another use of the compensation coil is to counter changes in the sensor's sensitivity over a range of operating temperatures. The sensor's measurement sensitivity typically decreases with increasing temperature. In some applications, particularly automobiles, this can lead to significant measurement inaccuracy, because of the wide range of temperatures experienced in those environments. For example, due to solar loading, winter operation, and other factors, a compass used in an automobile can experience operating temperatures from $-40°$ C. to $+120°$ C. Changes in the sensor's output over this temperature range can drastically affect the accuracy of the compass. It is thus desirable to provide some means of compensating for sensor output changes over temperature.

The sensors have the property that at zero output (i.e. the bridge is balanced), the sensor is temperature-insensitive. It is thus possible to use the compensation coil to induce a field equal, but opposite, to the applied external magnetic field. The sum of these two fields, external and compensation, brings the bridge into balance, operating the sensor at a point where its output is not sensitive to temperature. It is then possible to indirectly measure the strength of the external (i.e the Earth's) magnetic field by measuring the amount of current required by the compensation coil to generate an equal and opposite field.

However, this use of the compensation coil obviates its use for compensating for perturbing influences. These perturbing influences are most certainly still present, though, and some means for removing them must be provided. In the compass described, mathematical algorithms are used, in place of electro-magnetic feedback via the compensation coil, to remove the measurement errors caused by perturbing external magnetic fields.

For use as a compass, two magnetoresistive sensors are required. The two sensors are oriented orthogonal (i.e. at 90° angles) to each other. Their sensitive directions are oriented such that one measures the angle of the sensor bridge relative to the Earth's magnetic north pole. Because the other sensor is rotated 90°, it will actually align its sensitive direction to the Earth's magnetic field when the compass is pointing east. The use of the two sensors gives enough information to allow the calculation, using trigonometric functions, of the angular orientation of the sensor relative to the Earth's magnetic field.

This description refers to the circuit diagram, one set of which is in the provisional application, and another set which is FIGS. 3A, 3B, 3C and 3D. The specific implementation described proposes to use an Application-Specific Integrated Circuit (ASIC), though this is certainly not the only feasible approach possible. There are also some ancillary circuits described which are application is dependent and are not needed by, or suited to, every possible compass design. There are also some external elements, such as power supplies, that are not shown.

In general, the compass is implemented with two magnetoresistive sensors, arranged as described above, some conditioning circuitry, and a microcomputer.

If a compensation coil is used, as the current flows in the compensation coil the sensor output from the sensor changes How much, and in what direction, the sensor output changes depends on the magnitude and direction of the current in the compensation coil, which in turn is directly controlled by the PWM value calculated as by the operating software program.

An Intel 89C51 microcomputer core used to perform calculations and the various support circuits required to implement a working processor. Random-Access-Memory (RAM) is provided for temporary read/write storage. The Masked ROM (Read-Only-Memory) is used to store the software-operating program. An electrically-Erasable-Read-Only-Memory is used for non-volatile storage of data (e.g. calibration information, variation parameters, etc.). This particular implementation also includes circuitry to provide serial communication with other computer devices.

The sensor outputs are flipped via currents provided by switches Q1 and Q1. The switching rate and control signals for these switches are generated under software control by the microcontroller.

As described above, two magnetoresistive sensors, one for north and one for east, are used to measure the orientation of the compass with respect to the Earth's magnetic field. The output of each sensor is relatively small voltage summed with error voltages caused by non-ideal operation of the sensor. The set/reset mode of sensor operation separates the error and signal components. The AC measurement signal is separated from the DC error voltage by use of a low-pass filter. The cutoff frequency of the filter is set much lower than the flipping frequency, so that the DC error is separated. The resulting DC error is fed back to an amplifier, which performs the dual function of amplifying the AC measurement signal, and by means of negative feedback, removing the DC error bias. A second amplifier provides more signal gain after the sensor error biases have been removed.

The same amplifier/feedback circuitry is duplicated for each of the two sensors. There is also a block used to generate a reference voltage, which is required for use with a unipolar power supply.

The conditioned output of the sensors is measured by means of an Analog-to-Digital Converter (ADC) located in the microcontroller. This translates the analog voltage produced by the sensors into a digital value, which can be processed by the operating software. There is one ADC channel used for each of the two sensors, with an additional channel required to measure the reference voltage (the reference voltage is a consequence of practical operating considerations; some implementations may not require its use).

As described above, temperature compensation of the sensor output is accomplished by forcing the sensor output to zero, by means of the compensation coil. The microcomputer does this by Digital-to Analog (DAC) conversion of a digital is value, computed by software, which is used to generate a current passed through the compensation coil. The circuitry in the provisional application illustrates the method by which this is done.

The digital value determined by the software is input to a Pulse —Width— Modulator (PWM), which generates a sequential digital waveform which has a duty cycle that is dependent on the digital input value. A digital waveform can have only two states—on or off; the duty cycle is simply the ratio of the amount of time the waveform is switched on to the amount of time that the waveform is switched off. By integrating the PWM output waveform with a suitable filter, it is possible to produce an analog DC output voltage that is proportional to the duty cycle of the digital input signal.

The analog output voltage produced by the PWM and filter is then used to generate a current in the compensation coil by means of the circuitry shown in Figure sensor. The PWM value is used as the raw data input to the mathematical algorithms used by the program software to calculate the compass heading.

The software program, by means of injecting current into the compensation coil and then examining the sensor output via ASDC measurement can, by a process known as successive approximation, force the sensor output to become zero. The value of the PWM required to achieve this null of the sensor output is then an indirect measure of the external field applied to the sensor. The PWM value is used as the raw data input to the mathematical algorithms used by the program software to calculate the compass heading.

Referring to the figure set of FIGS. 3A, 3B, 3C and 3D, an improved embodiment is shown. In general the description above is applicable to this embodiment, which has differences which will be understood by those skilled in the art.

Figure 3A:
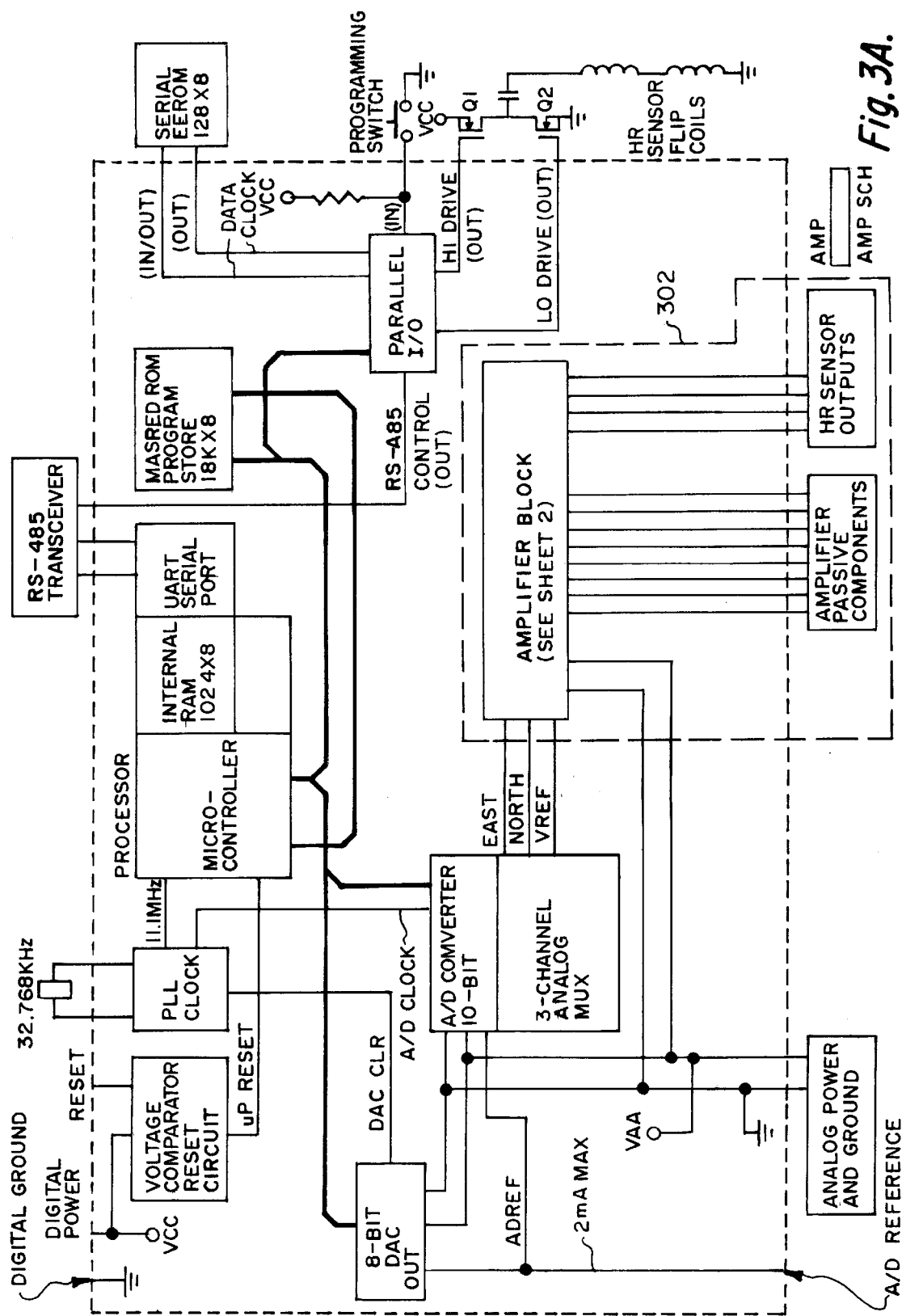
FIG. 3A is a block diagram of the circuitry.
Figure 3B:
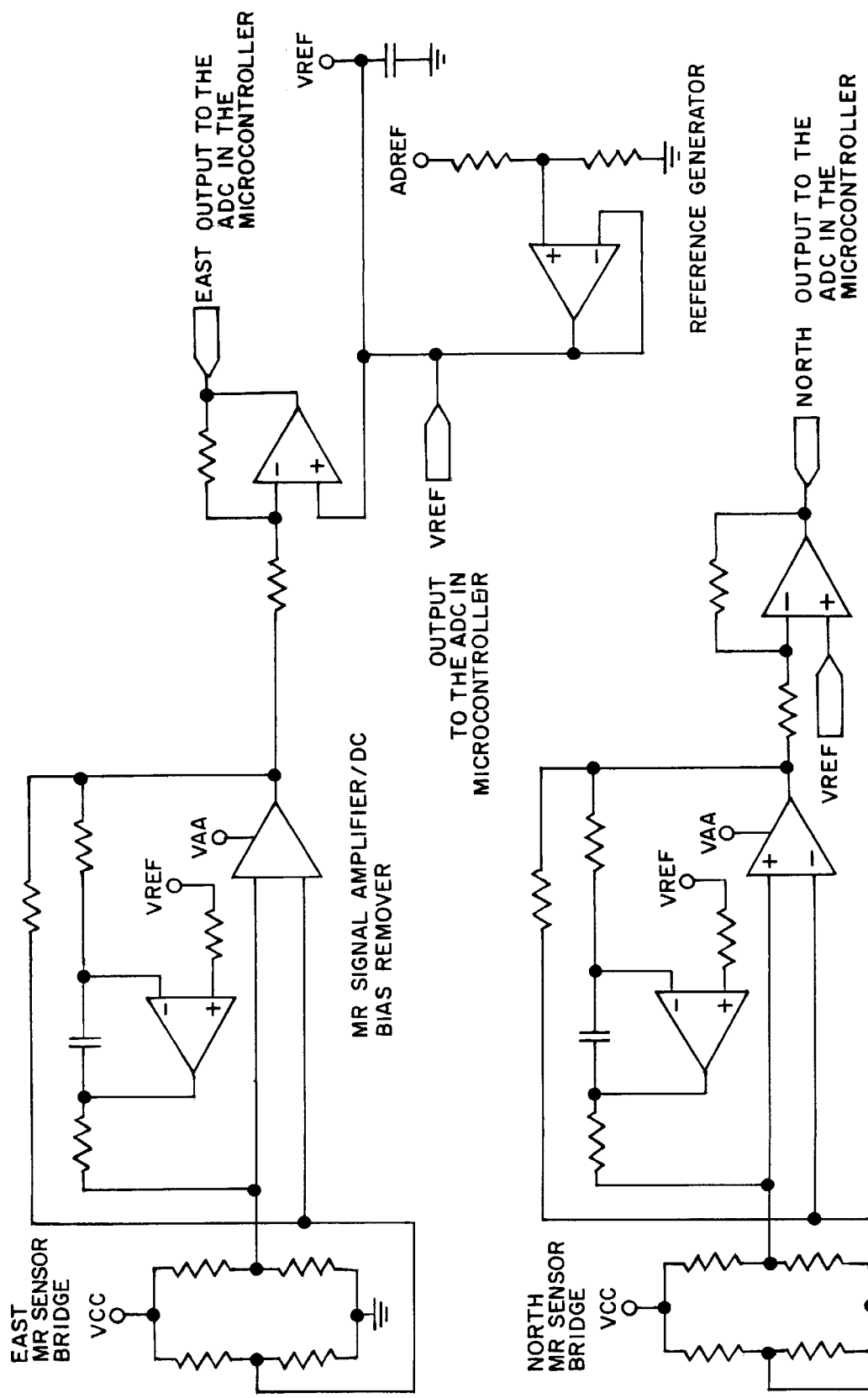
FIG. 3B is a continuation detail of the block diagram of the circuitry.

FIGS. 3A and 3B are a block diagram of the circuitry, FIG. 3B being detail of the portion enclosed in the dashed lines 302.

Figures 1, 3C:
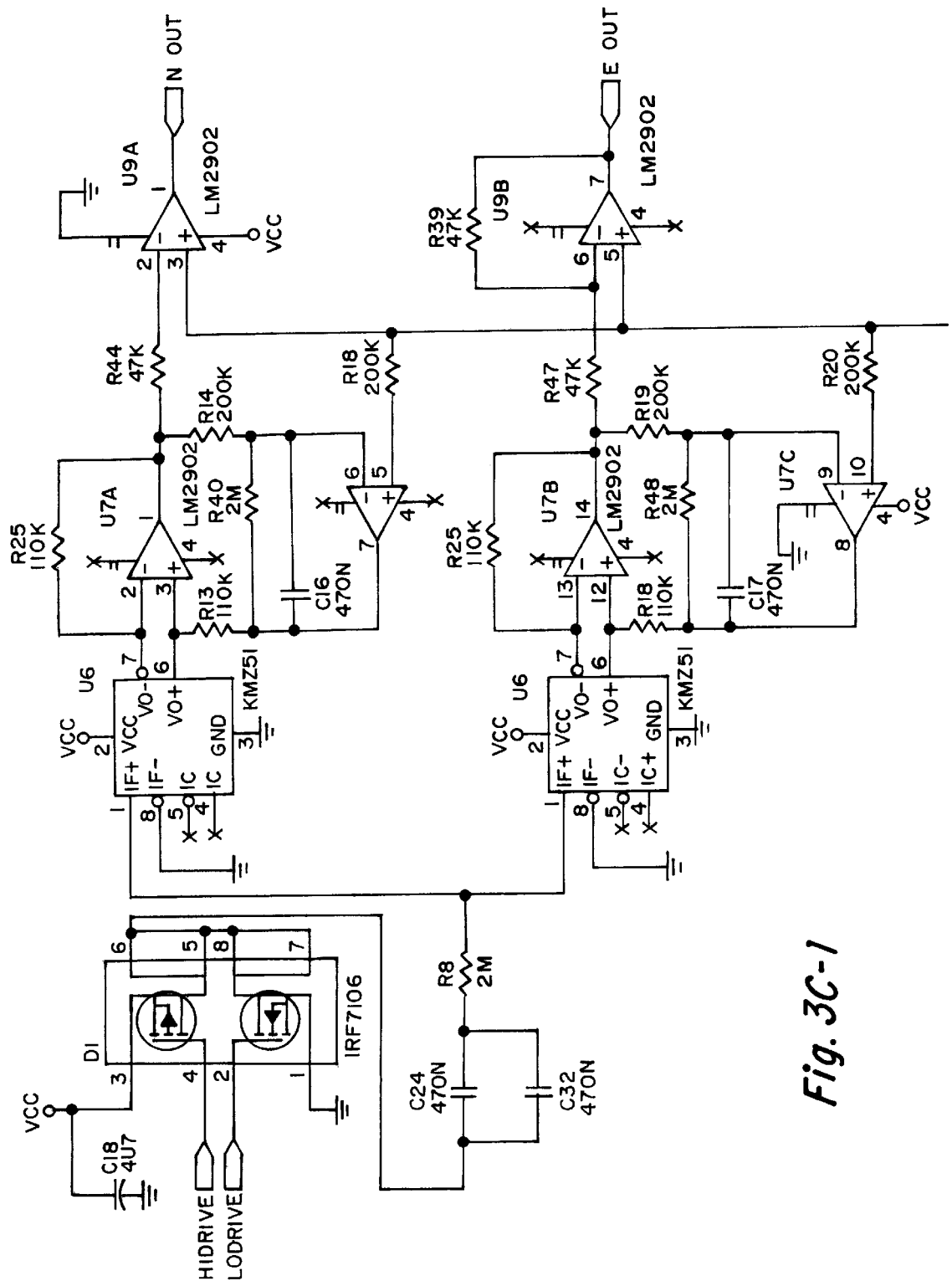
FIG. 3C is circuitry schematic, including the sensors.
Figures 2, 3C:
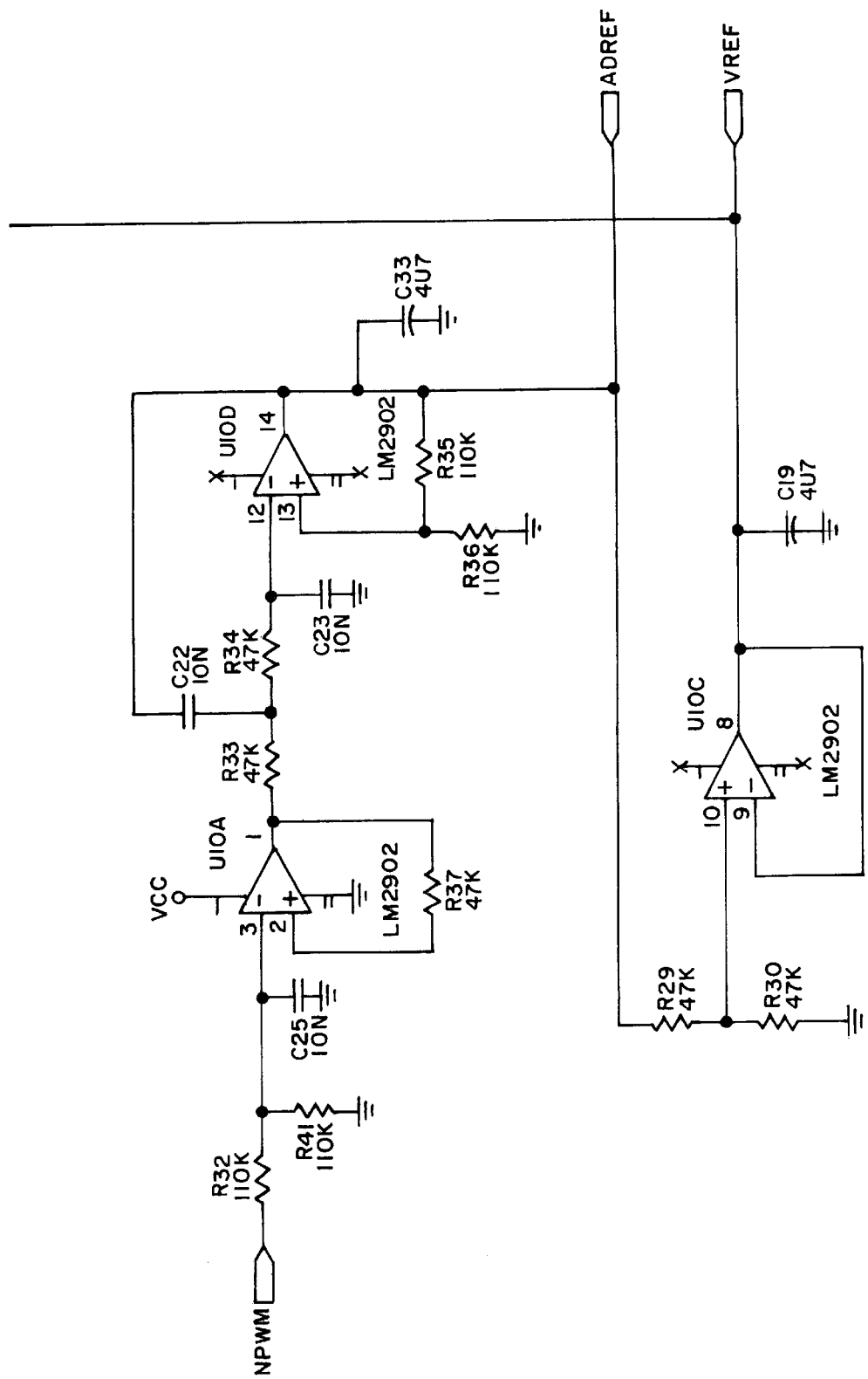

Referring to FIG. 3C, items KMZ51 are the two magnetoresistive sensors whose outputs VO– and VO+ are differential voltage output, which corresponds to the angular position of the sensor within the magnetic field. In FIG. 3C, the outputs NOUT and EOUT are the north and east components, respectively of the heading vector. The VREF output is output of the reference voltage for the amplifier circuitry.

The input NPWM is from the microcontroller and is an input of a digital waveform whose duty cycle can be set under software control by the microcontroller. The circuitry following NPWM is a low pass filter that converts the digital waveform to an analog DC voltage, which is proportional to the duty cycle of the input waveform. In addition the analog DC voltage is divided by two, the resulting voltage being used as a reference voltage.

The ADREF output goes to the microcontroller and is used as the reference voltage for the ADC in the microcontroller. Also the VREF is generated, which is the ADREF divided by two and is used as a reference voltage for all of the analog amplifiers in the circuit.

HIDRIVE and LODRIVE are digital signals from the microcontroller to complementary MOSFET switches. They flip the polarity of the magnetoresistive sensors. The flipping increases sensitivity of the sensor and allows removal of DC biases.

Figures 1, 3D:
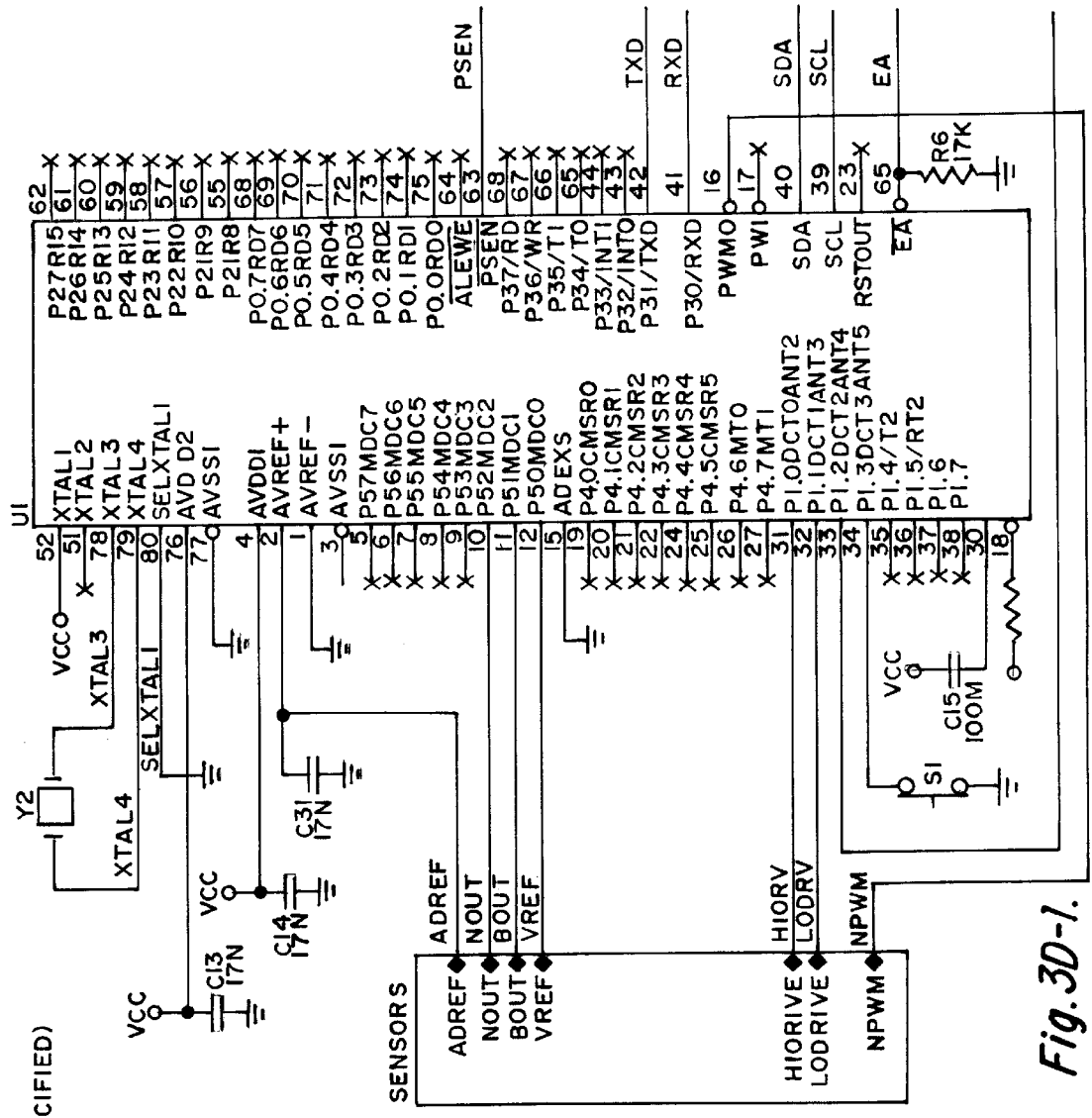
FIG. 3D is circuitry schematic, including the microcontroller.
Figures 2, 3D:
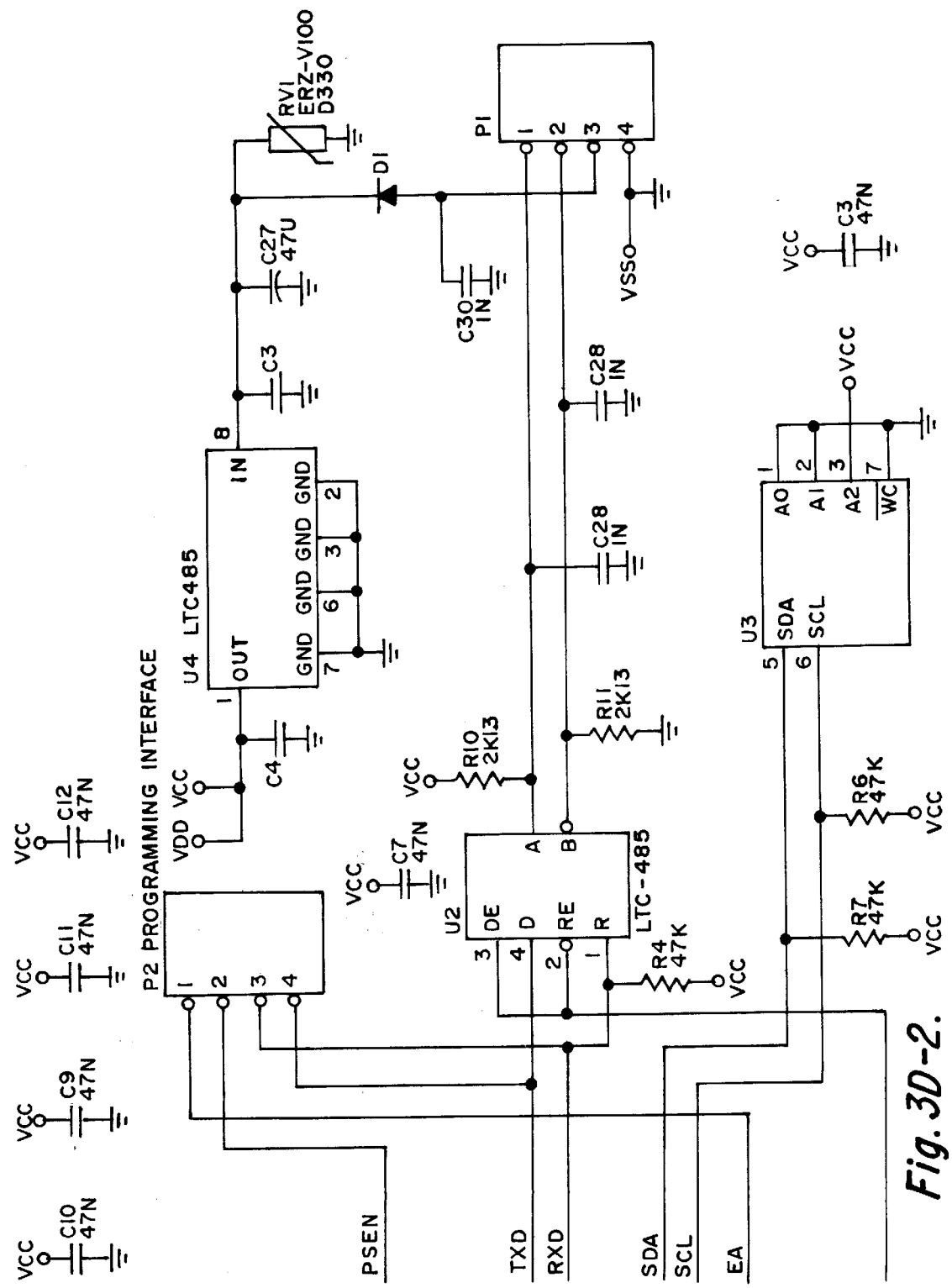

FIG. 3D shows the microcontroller U1, which in this example is an INTEL 8051, where the program is stored. It also contains the PWM, the circuits for the serial port, parallel input output circuits, random access data memory, and processor state clock circuits. The microprocessor also provides the HIDRIVE and LODRIVE signals used to control the flipping circuit for the circuits.

P1 is the power input and communication input/output connector. The circuitry is a five-volt voltage regulator to supply all of the voltage to the circuitry via VCC and VDD. U2 is an RSA85 transceiver to enable serial communication with external devices. U3 is an EEROM used to provide non-volatile storage of the calibration constants and operating parameters.

There is also a switch (S1) for the operator to set various modes and for other control by the user

INTEGRATED SYSTEM

Figure 4A:
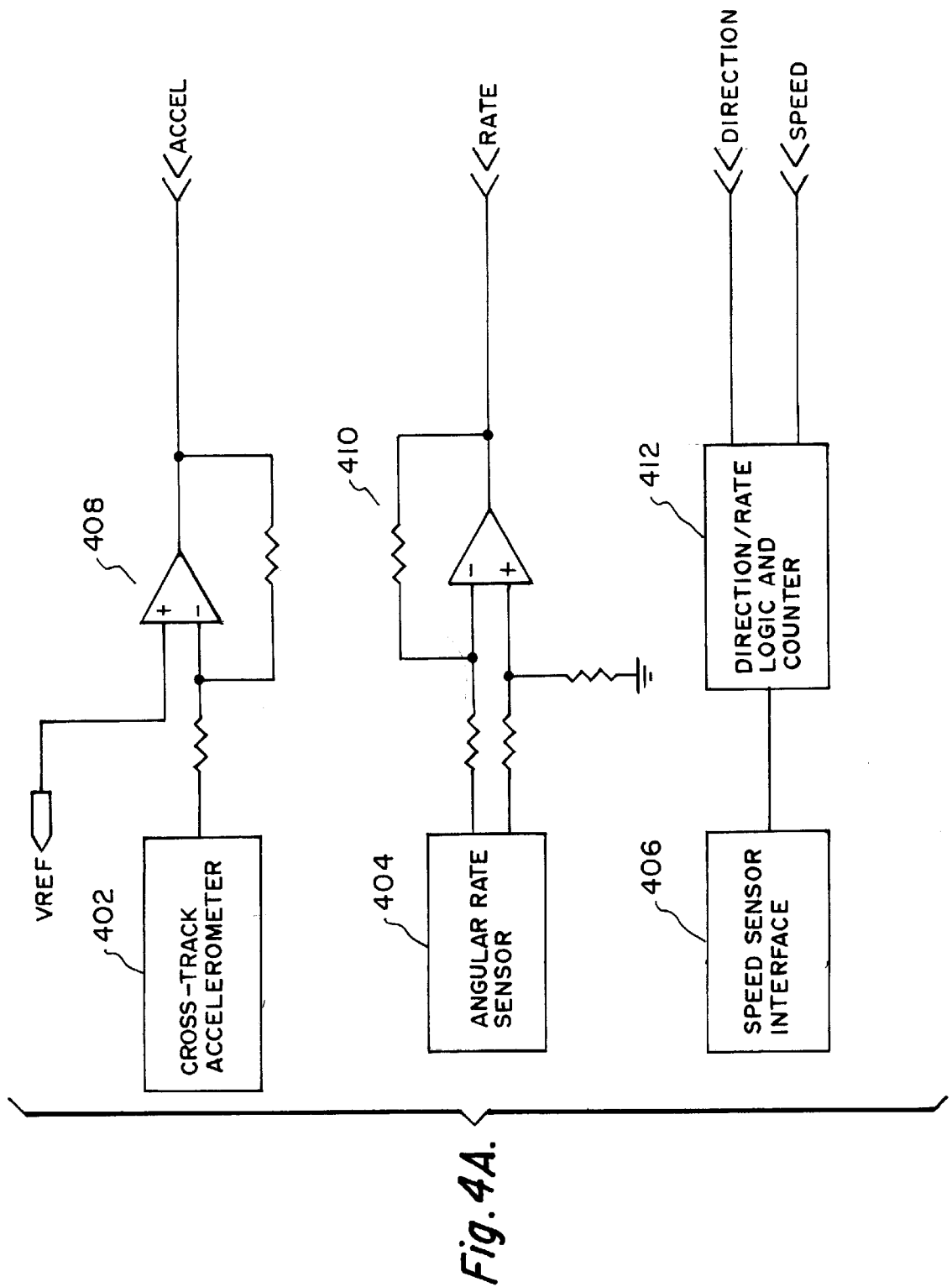
FIG. 4A is a block diagram of the circuit of the integrated system using on-board sensors.
Figure 4B:
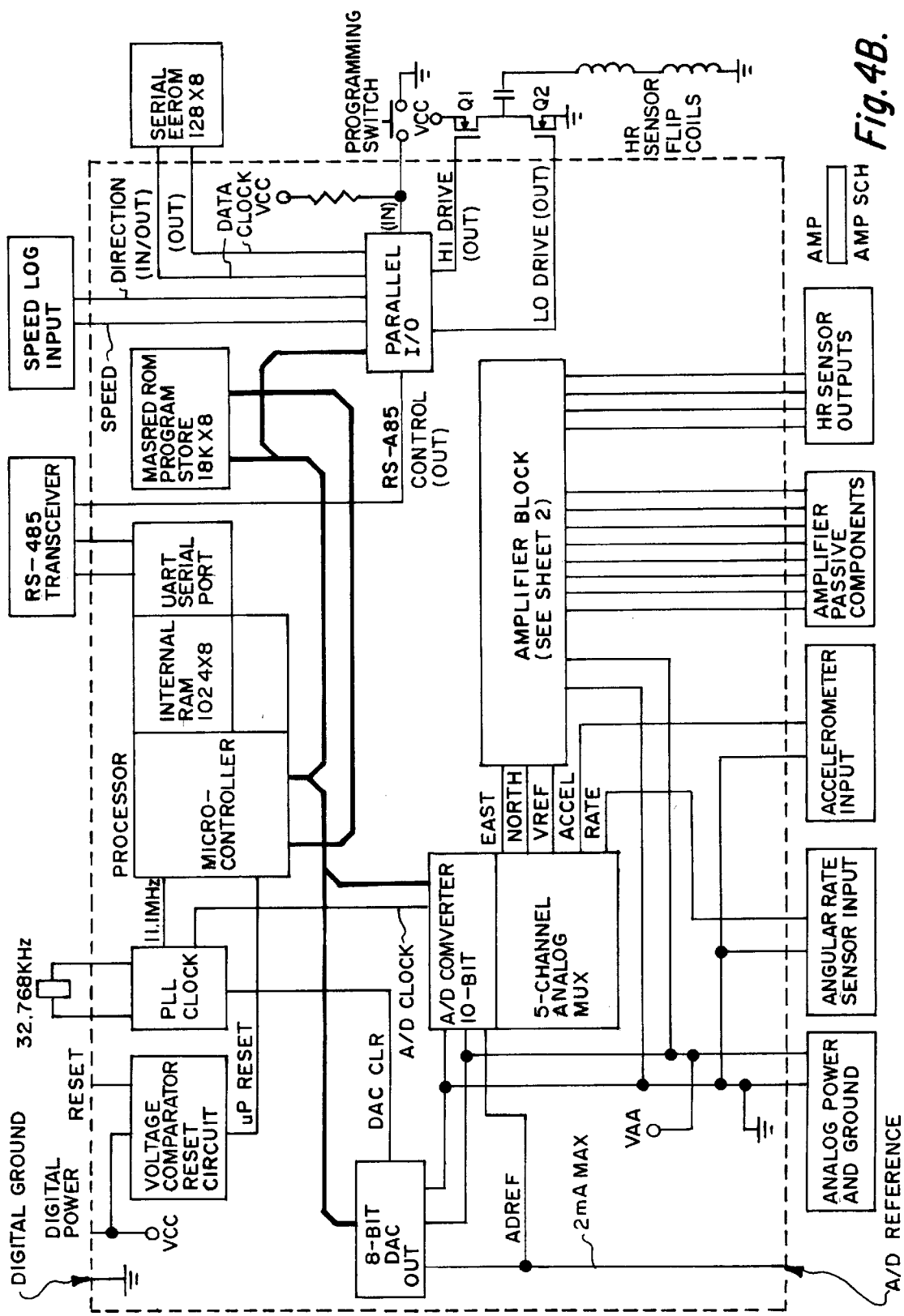
FIG. 4B is a further block diagram of the circuit of the integrated system using on-board sensors.

FIGS. 4A and 4B show a variation of the system as an integrated dead reckoning sensor system based on multiple sensors including GPS, magnetic compass, cross-track accelerometer, angular rate sensor and speed sensor.

Because of obscurations due to buildings or any physical structure, the ability to constantly track four or more GPS satellite signals cannot be guaranteed. For this reason there is a strong desire to develop a system that can provide navigation ability during short periods of GPS signal loss. The GPS Flywheel integrated concept and system solves this problem by providing an integrated system of sensors. The judicious choice of an array of low cost sensors provides high reliability at a low cost. To this end, in the preferred implementation, three sensors and one optional sensor are chosen to aid the GPS in providing a constant and accurate navigation solution.

The low cost MR sensor compass described and a cross-track accelerometer may be used to provide heading information. A speed sensor is used to provide rate information along the heading. An angular rate sensor is a more expensive but more accurate device that can be used in place of the cross-track accelerometer in applications that require the improved accuracy. These sensors compliment each other well. The compass provides heading information but cannot provide any motion information. The speed sensor provides rate information but does not provide direction or heading information. The cross-track accelerometer provides a check to the compass heading as well as providing a second source of heading information—however, the accelerometer data must be integrated and applied to an already known heading. These sensor inputs can be fed to a Kalman filter. The variances of the various sensors may be calculated and provided to the Kalman filter in order to use the sensors optimally. Additionally, heuristic steps may be implemented prior to the incorporation of sensor input to the Kalman filter. Specifically, for example, the cross-rack accelerometer can be used to detect unreasonable changes in heading provided by the compass in the presence of magnetic anomalies. If the comparison of the cross-track accelerometer data and the compass heading information disagree by a selected predetermined threshold, the compass reading can be invalidated, rejected and will not influence the Kalman filter output or calibration.

The system will operate in a calibration mode while the GPS quality is good. Then when outages do occur, the calibrated outputs from the other sensors will provide a means for navigation.

Calibration of the various sensors may be achieved as follows:

Cross Track Accelerometer Calibration: The means of computing highly accurate velocity information from integrated GPS carrier phase cycles is well known. A good estimate of acceleration may be accomplished by computing the rate change of this velocity. The acceleration can be represented in a locally level—North aligned coordinate system. From the components of this acceleration, the component of acceleration that is not along the direction of travel can be calculated and directly differenced from the acceleration provided by the cross-track accelerometer. This calibration term can be stored and used to aid navigation during GPS outages. Also the calibrated accelerometer may be used to reject erroneous compass readings.

Speed Sensor Calibration: Once again, the reliable GPS velocity information may be used to calibrate the speed sensor input. In this case the magnitude of the horizontal components of the GPS derived velocity is computed and compared to the speed sensor input. A speed sensor calibration term may be easily computed as the difference between the two speeds just mentioned. A more precise method would be to store the biases at the various speeds and compute the slope of the bias as a function of speed.

Compass Calibration: Again the GPS velocity information when in motion can be used to calibrate the compass heading. Some heuristic algorithm and filtering techniques will need to be applied to ensure the calibration terms are generated only when the compass is providing typical heading information. That is, compass calibration should only occur in the absence of temporary magnetic anomalies. To obtain the calibration, the locally level North aligned coordinate system should be used to make a direct comparison of the compass heading to the North and East components of the GPS velocity. Further of course, the calibration should only occur when the magnitude of the GPS velocity (speed) is above a specified threshold.

Turn Rate Sensor Calibration: Again by the use of the accurate GPS velocity the turn rate sensor may be calibrated. In this case, the GPS velocity is transformed into a locally level north aligned coordinate system. The output of the turn rate sensor can be integrated to provide an angular displacement. The same displacement over the same time period may be calculated by the difference in the GPS velocity. The difference in the two angular displacements is the calibration term for the rate sensor.

One of the sensors, the magnetoresistive compass, has been described above. Referring to FIG. 4A, 402, 404 and 406 are the cross-track accelerometer the angular rate sensor and the speed sensor interface, respectively. The cross-track accelerometer is oriented perpendicular to the track of the vehicle and is sensitive to acceleration perpendicular to the track of the vehicle. It is used to measure acceleration due to centrifugal force as the vehicle turns. In that capacity it is used as a turn sensor to aid the jitter algorithm, which is aided in order to distinguish actual jitter from a transient magnetic anomaly from any similar effect (measurement vector movement) due to turning of the vehicle. Since the vector changes due to turning might be otherwise seen as jitter, the accelerometer input will allow that to be disregarded as jitter, so that only jitter due to anomalies will be processed. Jitter due to magnetic anomalies can be differentiated from measurement vector changes due to vehicle turn.

The angular rate sensor develops a voltage output that is proportional to the rate of turn about its sensitive axis. In this case, the sensitive axis is mounted perpendicular to the plane of travel of the vehicle, vertically. So, this measures how fast the vehicle is turning, the angular rate of turn. The output of the accelerometer is amplified by the circuit 308 and its output is at ACCEL to the ADC in the microcontroller as an analog voltage which is proportional to the cross-track acceleration and is then used by the software in the microcontroller.

The magnetoresistive compass is north seeking. In the integrated dead reckoning solution, the angular rate sensor output will aid or substitute for the compass output when the compass is under the effect of transient anomalies. So when a transient anomaly is detected, such as by jitter detection, the system can weigh more heavily or rely entirely on the angular rate sensor to adjust heading.

The angular rate sensor is initialized, as is normal in their application.

The output of the angular rate sensor is amplified by the circuit 410 and its output, RATE, to the ADC of the microcontroller is an analog voltage proportional to the angular rate.

The speed sensor interface takes velocity information from sensors, including but not limited to speed and direction. The logic 412 decodes the information to provide the output DIRECTION and SPEED to a parallel I/O and then are made available to the microcontroller bins and used by the microcontroller.

Not shown on the figures, the GPS receiver is connected to the serial port of the microcontroller.

As shown in FIG. 4B, all of the sensors are integrated to use each of them when most advantageous.

While there have been described above the principles of this invention in connection with specific embodiments, it is to be understood that this is by way of example and not limitation the scope of the invention.

What is claimed is:

1. Apparatus for calibrating the distortions in the readings of a magnetic compass having a plurality of magnetic field sensors and for characterizing and rejecting readings caused by transient magnetic disturbances comprising:

first means coupled to the compass sensors for obtaining the outputs from each of the sensors as a function of time by weighting and combining the outputs from each of the sensors at a first time and for a predetermined number of the next previous times to said first time to obtain a time filtered output for each of the sensors;

second means coupled to said first means to form from said sensors outputs measurement parameters having sensitivity values; said sensitivity values being variables in a generalized equation that represents the configuration and location of a geometrical figure defined by the focus of coordinates of said outputs, said outputs having distortions due to permanent and induced magnetism of the vehicle and distortions due to sensor imbalance between the misorientation of the magnetic compass sensors;

said second means for defining calibration coefficients of said measurement parameters in said equation;

third means coupled to said second means to incorporate said measurement parameters and said calibration coefficients into a least squares matrix and to solve for said calibration coefficients;

fourth means coupled to said third means for computing calibration parameters from said calibration coefficients that are to be applied to said outputs;

fifth means coupled to said first means and said fourth means for applying said calibration parameters to said outputs from said f&Art means to form an output from each of two sensors; said two sensors being orthogonally related to one another;

sixth means coupled to said fifth means for obtaining the calibrated compass heading from said two sensors outputs; and further comprising means for obtaining said outputs separately from said sensors at a selected rate sufficient to characterize the high frequency signature of transient magnetic disturbances and said characterization means further comprising means for analyzing the output separately from each of said sensors by comparing sensor reading magnitudes by application of a selected difference in magnitude as an acceptability threshold and using readings for heading determination which are within the acceptability threshold.

2. The apparatus of claim 1 including seventh means coupled between said fifth means and said sixth means for normalizing said two sensors outputs by dividing each of said two sensors outputs by dividing each of said two sensors outputs by the square root of the sum of the squares of each of said two sensors outputs.

3. The apparatus of claim 1 including eighth means coupled between each of said compass sensors and each of said first means and said second means for sensing the amplitude of the sensors outputs and increasing or creasing the amplitudes of the sensors outputs to fit within a predetermined sensor scale of amplitudes.

4. The apparatus of claim 3 wherein said eighth means comprises integrating means for integrating the sensors incremental outputs and increasing the number of sensors incremental outputs Integrated when the sensors outputs fall below the sensor scale and decreasing the number of sensors incremental outputs integrated when the sensors outputs are above the sensor scale.

5. The apparatus of claim 1 wherein said geometrical figure for the distorted vector outputs is In the shape of an ellipse and the geometric figure for the undistorted vector outputs is in the shape of a circle;

said generalized equation in said second means being:

$x^2+y^2=b_1+b_2(x^2-y^2)+b_3(-2xy)+b_4(2x)+b_5(2y)$ in said second means said measurement parameters being $m_0$, $m_1$, $m_2$, $m_3$, $m_4$, $m_5$ and having the sensitivity values $x^2+y^2$, 1, $x^2-y^2$, $-2xy$, $2x$ and $2y$, respectively: in said second means said calibration coefficients comprise:

$b_1=[a_1-(1-a_2)x^2_0-(1+a_2)y^2_0-2a_2x_0y_0]$ $b_2=a_2$ $b_3=a_3$ $b_4=[(1-a_2)x_0+a_3y_0]$ $b_5=[(1+a_2)y_0+a_3x_0]$ where $a_1=2b^2/(2-e^2)$ $a_2=e^2(C_2/(2-3^2)$ $a_3=e^2S_2/(2-e^2)$ a=semimajor axis of ellipse b=semiminor axis of ellipse $$c = \sqrt{a^2 - b^2 / a^2}$$

$C_2$=cosine (2θ) and $S_2$=sine (2θ)

θ=rotation angle of ellipse x,y=coordinates of center of ellipse prior to offset $x_0, y_0$=coordinates of offset center of ellipse said least squares matrix in said third means comprises:

$$\begin{bmatrix} \sum m_0 m_1 \\ \sum m_0 m_2 \\ \sum m_0 m_3 \\ \sum m_0 m_4 \\ \sum m_0 m_5 \end{bmatrix} =$$

$$\begin{bmatrix} \sum m_1 m_1 & \sum m_1 m_2 & \sum m_1 m_3 & \sum m_1 m_4 & \sum m_1 m_5 \\ \sum m_1 m_2 & \sum m_2 m_2 & \sum m_2 m_3 & \sum m_2 m_4 & \sum m_2 m_5 \\ \sum m_1 m_3 & \sum m_2 m_3 & \sum m_3 m_3 & \sum m_3 m_4 & \sum m_3 m_5 \\ \sum m_1 m_4 & \sum m_2 m_4 & \sum m_3 m_4 & \sum m_4 m_4 & \sum m_4 m_5 \\ \sum m_1 m_5 & \sum m_2 m_5 & \sum m_3 m_5 & \sum m_4 m_5 & \sum m_5 m_5 \end{bmatrix} \begin{bmatrix} b_1 \\ b_2 \\ b_3 \\ b_4 \\ b_5 \end{bmatrix}$$

$B = [\Sigma(M^T M)]^{-1} [\Sigma(M^T m_0)]$ where the matrix $[\Sigma(M^T M)]^{-1}$ is the inverse of the matrix $\Sigma(M^T M)$ said calibration parameters in said fourth means comprise:

$e^2/(2-e^2) = b_2^2 + b_3^2$ $K = \sqrt{b_2^2 + b_3^2}$  $\quad D = 1 - K^2$ $B_x = [b_4(1+b_2) - b_3 b_3]/D \quad B_y = [b_5(1-b_2) - b_4 b_3]/D$ $h = \sqrt{(1-K)/(1+K)} \quad C_2 = b_2/K$ $S_2 = b_3/K \quad f = 1 - h$ $g = 1 + n \quad K_1 = g - \int C_2$ $K_2 = \int S_2 \quad K_3 = g + \int C_2$ $a_{11} = 2K_2 \quad a_{21} = 2K_3$ $a_{12} = \sqrt{3} K_1 - K_2$ $a_{22} = \sqrt{3} K_2 - K_3$ $a_{13} = -\sqrt{3} K_1 - K_2$ $a_{23} = -\sqrt{3} K_2 - K_3$ $B_u = B_y \quad B_v = (\sqrt{3} B_x - B_y)/2$ $B_w = (-\sqrt{3} B_x - B_y)/2.$ 6. The apparatus of claim 5 wherein the number of sensors in the compass is three and the three sensors are arcuately spaced 120° from one another and the outputs from the three sensors are U, Y, W respectively, said first means comprises push down stack means for obtaining time filtered outputs U", V", W" having the form:

$F = P_1 - P_2 - 2P_3 + 4P_4 - 2P_5 - P_6 + P_7$ where for the U reading F=U"(t), $P_1$=U(t), $P_2$=V(t-1), $P_3$=W(t-2), $P_4$=U(t-3), $P_5$=V(t-4), $P_6$=W(t-5), $P_7$=U(t-6); where for the V reading F=V"(t), $P_1$=V(t), $P_2$=W(t-1), $P_3$=U(t-2), $P_4$=V(t-3), $P_5$=W(t-4), $P_6$=U(t-5), $P_7$=V(t-6); where for the W reading F=W"(t), $P_1$=W(t), $P_2$=U(t-1), $P_3$=V(t-2), $P_4$=W(t-3), $P_5$=U(t-4), $P_6$=V(t-5), $P_7$=W(t-6) and where t= present time and (t-n) is the time equal to the present time t minus the next previous n times units.

7. The apparatus of claim 6 wherein said filtered outputs from said three sensors are U", V", W" respectively and said two sensor outputs are X, Y respectively, and said fifth means converts to the said two sensor outputs by obtaining:

$X = \alpha_{11}(U" - B_u) + \alpha_{12}(V" - B_v) + \alpha_{13}(W" p31 \ B_w)$ $Y = =_{21}(U" - B_u) + \alpha_{22}(V" - B_v) + \alpha_{23}(W" - B_w).$ 8. The apparatus of claim 7 wherein said fifth means is for normalizing the X, Y outputs to obtain X', Y', respectively, as follows:

$X' = X / \sqrt{X^2 + Y^2}$ $Y' = Y / \sqrt{X^2 + Y^2}.$

9. The apparatus of claim 8 wherein said sixth means is for obtaining the heading are tangent from X', Y'.

10. The apparatus of claim 1 wherein the number of sensors in the compass is three and the three sensors are arcuately spaced 120° from one another and the outputs from the three sensors are U, V, W respectively, said first means comprises push don stack means for obtaining time filtered outputs U", V", W" having the form:

$F = P_1 - P_2 - 2P_3 + 4P_4 - 2P_5 - P_6 + P_7$ where for the U reading F=U"(t), $P_1$=U(t), $P_2$=V(t-1), $P_3$=W(t-2), $P_4$=U(t-3), $P_5$=V(t-4), $P_6$=W(t-5), $P_7$=V(t-6); where for the W reading F=W"(t), $P_1$=W(t), $P_2$=U(t-1), $P_3$=V(t-2), $P_4$=W(t-3), $P_5$=U(t-4), $P_6$=V(t-5), $P_7$=W(t-6) and where t=present time and (t-n) is the time equal to the present time t minus the next previous n time units.

11. The apparatus of claim 10 wherein said filtered outputs from said three sensors are U", V", W" respectively and said two sensor outputs are X, Y respectively, and said fifth means converts to the said two sensor outputs by obtaining:

$X = a_{11}(U" - B_u) + a_{12}(V" - B_v) + a_{13}(W" - B_w)$ $Y = a_{21}(U" - B_u) + a_{22}(V" - B_v) + a_{23}(W" - B_w).$

12. The apparatus of claim 11 wherein said fifth means is for normalizing the X, Y outputs to obtain X', Y', respectively, as follows:

$X' = X / \sqrt{X^2 + Y^2}$ $Y' = Y / \sqrt{X^2 + Y^2}.$

13. The apparatus of claim 12 wherein said sixth means is for obtaining the heading arc tangent from X', Y'.

14. A method for calibrating the distortions in the readings of a magnetic compass having a plurality of magnetic field sensors and for characterizing and rejecting readings caused by transient magnetic disturbances comprising:

a first step of obtaining the outputs from each of the sensors;

a second step of forming from said sensors outputs measurement parameters having sensitivity values; said sensitivity values being variables in a generalized equation that represents the configuration and location of a geometrical figure defined by the locus of coordinates of said outputs, said outputs having distortions due to permanent and induced magnetism of the vehicle and distortions due to sensor imbalance between and misorientation of the magnetic compass sensors;

said second step defining calibration coefficients of said measurement parameters in said equation;

a third step of incorporating said measurement parameters and said calibration coefficients into a least squares matrix and solving for said calibration coefficients;

a fourth step of computing calibration parameters from said calibration coefficients that are to be applied to said outputs;

a fifth step of applying said calibration parameters to said outputs from said first step to form an output from each of two sensors; said two sensors being orthogonally related to one another;

a sixth step of obtaining the calibrated compass heading from said two sensors outputs; and further comprising the steps of obtaining said outputs separately from said sensors at a selected rate sufficient to characterize the high frequency signature of transient magnetic disturbances and said characterization further comprising analyzing the output separately from each of said sensors by comparing sensor reading magnitudes by application of a selected difference in magnitude as an acceptability threshold and using readings for heading determination which are within the acceptability threshold.

15. The method of claim 14 wherein said first step comprises obtaining the outputs from each of the sensors as a function of time by weighting and combining the outputs from each of the sensors at a first time and for a predetermined number of the next previous times to said first time to obtain a time filtered output for each of the sensors.

16. The method of claim 14 including a seventh step of normalizing said two sensors outputs by dividing each of said two sensors outputs by the square root of the sum of the squares of each of said two sensors outputs.

17. The method of claim 14 including an eighth step of sensing the amplitude of the sensor outputs and increasing or decreasing the amplitudes of the sensor outputs to fit within a predetermined sensor scale of amplitudes.

18. The method of claim 17 wherein said eighth step comprises integrating the sensor incremental outputs and increasing the number of sensor incremental outputs integrated when the sensor outputs fall below the sensor scale and decreasing the number of sensor incremental outputs integrated when the sensor outputs are above the sensor scale to fit the outputs within a predetermined sensor scale of amplitudes.

19. The method of claim 14 wherein said geometrical figure for the distorted vector outputs is in the shape of an ellipse and the geometric figure for the undistorted vector outputs is in the shape of a circle;

said generalized equation being;

$$x^2+y^2=b_1 b_2(x^2-y^2)+b_3(-2xy)+b_4(2x)+b_5(2y)$$

said measurement parameters being $m_0$, $m_1$, $m_2$, $m_3$, $m_4$, $m_5$ and having the sensitivity values $x^2+y^2$, 1, $x^2-y^2$, 2xy, 2x and 2y, respectively; said calibration coefficients comprise:

$$b_1 = [a_1 - (1-a_2)x_0^2 - (1+a_2)y_0^2 - 2a_3 x_0 y_0]$$

$$b_2 = a_2$$

$$b_3 = a_3$$

$$b_4 = [(1-a_2)x_0 + a_3 y_0]$$

$$b_5 = [(1+a_2)y_0 + a_3 x_0]$$

where $$a_1 = 2b^2/(2-e^2)$$

$$a_2 = e^2(C_2/(2-e^2))$$

$$a_3 = e^2 S_2/(2-e^2)$$

$a$ = semimajor axis of ellipse $b$ = semiminor axis of ellipse $$c = \sqrt{a^2 - b^2/a^2}$$

$C_2 = \text{cosine}(2\theta)$ and $S_2 = \text{sine}(2\theta)$ $\theta$ = rotation angle of ellipse $x, y$ = coordinates of center of ellipse prior to offset $x_0, y_0$ = coordinates of offset center of ellipse said least squares matrix in said third means comprises:

$$\begin{bmatrix} \sum m_0 m_1 \\ \sum m_0 m_2 \\ \sum m_0 m_3 \\ \sum m_0 m_4 \\ \sum m_0 m_5 \end{bmatrix} =$$

$$\begin{bmatrix} \sum m_1 m_1 & \sum m_1 m_2 & \sum m_1 m_3 & \sum m_1 m_4 & \sum m_1 m_5 \\ \sum m_1 m_2 & \sum m_2 m_2 & \sum m_2 m_3 & \sum m_2 m_4 & \sum m_2 m_5 \\ \sum m_1 m_3 & \sum m_2 m_3 & \sum m_3 m_3 & \sum m_3 m_4 & \sum m_3 m_5 \\ \sum m_1 m_4 & \sum m_2 m_4 & \sum m_3 m_4 & \sum m_4 m_4 & \sum m_4 m_5 \\ \sum m_1 m_5 & \sum m_2 m_5 & \sum m_3 m_5 & \sum m_4 m_5 & \sum m_5 m_5 \end{bmatrix} \begin{bmatrix} b_1 \\ b_2 \\ b_3 \\ b_4 \\ b_5 \end{bmatrix}$$

$$B = \left[\sum (M^T M)\right]^{-1} \left[\sum (M^T m_0)\right]$$

where the matrix $\left[\sum (M^T M)\right]^{-1}$ is the inverse of the matrix $\sum (M^T M)$ said calibration parameters comprise:

$$e^2/(2-e^2) = b_2^2 + b_3^2$$

$$K = \sqrt{b_2^2 + b_3^2} \qquad D = 1 - K^2$$

$$B_x = [b_4(1+b_2) - b_3 b_3]/D$$

$$B_y = [b_5(1-b_2) - b_4 b_3]/D$$

$$h = \sqrt{(1-K)/(1+K)} \qquad C_2 = b_2/K$$

$$S_2 = b_3/K \qquad f = 1 - h$$

$$g = 1 + n \qquad K_1 = g - \int C_2$$

-continued $$K_2 = \int S_2 \quad\quad K_3 = g + \int C_2$$

$$a_{11} = 2K_2 \quad\quad a_{21} = 2K_3$$

$$a_{12} = \sqrt{3}\,K_1 - K_2$$

$$a_{22} = \sqrt{3}\,K_2 - K_3$$

$$a_{13} = -\sqrt{3}\,K_1 - K_2$$

$$a_{23} = -\sqrt{3}\,K_2 - K_3$$

$$B_u = B_y \quad\quad B_v = \left(\sqrt{3}\,B_x - B_y\right)/2$$

$$B_w = \left(-\sqrt{3}\,B_x - B_y\right)/2.$$

20. The method of claim 14 wherein said first step comprises compensating for the origin offset due to the permanent magnetic distortion effect of the vehicle on the compass vector outputs, id offset being the difference between the vector origin location of the distorted vector outputs for all headings of the compass and the vector origin location of the undistorted vector outputs for all headings of the compass;

said first step further comprising compensating for the difference in configuration of geometric figures defined by the distorted vector outputs and the undistorted vector outputs due to the induced magnetic distortion effects of the vehicle on the compass vector outputs for all headings of the compass.

21. Apparatus for calibrating the distortions in the readings of a magnetic compass having a plurality of magnetic field sensors and for characterizing and rejecting readings caused by transient magnetic disturbances comprising:

first means coupled to the compass sensors for obtaining the outputs from each of the sensors;

second means coupled to said first means to form from said sensors outputs measurement parameters having sensitivity values; said sensitivity values being variable in a generalized equation that represents the configuration and location of a geometrical figure defined by the locus of coordinates of said outputs, said outputs having distortions due to permanent and induced magnetism of the vehicle and distortions due to sensor imbalance between and misorientation of the magnetic compass sensors:

said second means for defining calibration coefficients of said measurement parameters in said equation;

third means coupled to said second means to incorporate said measurement parameters and said calibration coefficients into a least squares matrix and to solve for said calibration coefficients;

fourth means coupled to said third means for computing calibration parameters from said calibration coefficients that are to be applied to said outputs;

fifth means coupled to said first means and said fourth means for applying said calibration parameters to said outputs from said first means to form an output from each of the two sensors; said two sensors being orthogonally related to one another;

sixth means coupled to said fifth means for obtaining the calibrated compass heading from said two sensors outputs; and further comprising means for obtaining said outputs separately from said sensors at a selected rate sufficient to characterize the high frequency signature of transient magnetic disturbances and said characterization means further comprising means for analyzing the output separately from each of said sensors by comparing sensor reading magnitudes by application of a selected difference in magnitude as an acceptability threshold and using readings which are within the acceptability threshold for heading determination.

22. An apparatus for automatically calibrating a mobile compass having a combination of a compass for providing heading outputs, said compass having a plurality of magnetic field sensors, electronic circuitry, and a programmed computer for calibration of the compass comprising;

an electronic compass having sensor elements which respond to magnetic fields and provide output signals related to the earth's magnetic field and distortions sensed by the sensor element;

means to translate the sensor output signals into digital values;

a computer portion programmed to receive the digital values of the sensor output signals and to perform an ellipse fit and a computer portion programmed to receive the digital values of the sensor output signals and to perform a circularization of the ellipse defined by the output signals to define an origin centered circle and to determine heading;

a computer portion programmed to define a selected number of angular segments of the circle as bins and to count the sensor outputs as data points according to the bin in which they fall;

a compute portion programmed to offset parameters of the ellipse as required by the data points as they are acquired in order to determine the bin for the data point;

a computer portion programmed to perform a least squares calibration of said compass being executed upon the counting of a selected number of one or more data points to a selected maximum in every bin, said calibration using all data points up to the maximum number per bin.

23. The apparatus of claim 22 wherein said computer is programmed to process incoming data from the compass at a rate at least about 5 per second.

24. The apparatus of claim 23 wherein said rate is about 12 per second.

25. A method of automatically calibrating a mobile compass system mounted in a vehicle, the system having a compass for providing heading outputs, said compass having a plurality of magnetic field sensors electronic circuitry, and a programmed computer comprising;

providing output signals from said electronic compass sensors;

allowing the vehicle to be driven without any regulation of its path;

performing an ellipse fit and circularization procedure on the output data to define an origin centered circle for the data points;

selecting a number of angular segments of the circle to define bins;

identifying data points to a bin according to its position on the circle;

offsetting ellipse parameters as data points are acquired in order to determine the bin for the data point;

calibrating the compass by a least squares calibration when each bin has at least one data point identified said calibration using all data points acquired.

26. The method of claim 25 wherein said computer is programmed to process incoming date from the compass at a rate at least about 5 per second.

27. The method of claim 26 wherein said rate is about 12 per second.

28. A system for detection and rejection for use in heading determination of transient magnetic anomalies in a mobile compass system having a programmed computer and having angularly separated magnetic field sensors comprising;

a computer portion programmed to receive readings separately from each of said sensors and to characterize from said readings the magnetic signature of the anomaly and to reject use for heading determination of readings that fall with said characterization; said characterization flier comprising separately for each sensor selecting an upper limit of frequency of change of readings and a threshold in magnitude of change of readings to define readings to be retained as those falling under said upper limit and below said threshold for use in determining heading.

29. The system of claim 28 wherein said computer is programmed to process incoming data from the compass at a rate of at least about 5 per second.

30. The system of claim 29 wherein said rate is about 12 per second.

31. A method for detection and rejection of transient magnetic anomalies in a mobile electronic compass system having magnetic sensors to provide components of sensed magnetic field location comprising;

in a programmed computer, receiving readings from a compass and characterizing from said readings, the high frequency signature of the anomaly and rejecting use of sensor readings that fall within said characterization, said characterization comprising;

taking said sensor output signals at a selected sufficiently high frequency to enable distinguishing the rapid sensor changes caused by the anomaly; and comparing the difference in magnitude of selected sequential readings against a selected magnitude difference threshold to define readings to be used for heading determination as those falling under the upper limit of frequency and below the threshold.

32. The method of claim 31 wherein said computer is programmed to process incoming data from the compass at a rate of at least about 5 per second.

33. The method of claim 32 wherein said rate is about 12 per second.

34. The method of claim 31 in which said frequency of taking sensor output signals is at least about 5 per second.

35. The method of claim 34 in which said frequency of taking sensor output signals is up to about 12 per second.

36. The method of claim 25 in which a maximum number of data points for each bin is selected and the data points used for calibration are all data points acquired up to the maximum identified in each bin.

* * * * *